US008992327B2

(12) United States Patent
Karsten

(10) Patent No.: US 8,992,327 B2
(45) Date of Patent: Mar. 31, 2015

(54) ONLINE GAMING SYSTEM

(75) Inventor: Peter Olof Karsten, London (GB)

(73) Assignee: Rational Intellectual Holdings Limited, Onchan (IM)

( * ) Notice: Subject to any disclaimer, the term of this patent is extended or adjusted under 35 U.S.C. 154(b) by 331 days.

(21) Appl. No.: 13/397,107

(22) Filed: Feb. 15, 2012

(65) Prior Publication Data

US 2012/0196686 A1 Aug. 2, 2012

Related U.S. Application Data

(63) Continuation of application No. 12/447,439, filed as application No. PCT/EP2007/061446 on Oct. 24, 2007, now abandoned.

(30) Foreign Application Priority Data

Oct. 27, 2006 (GB) .................................. 0621434.0
Oct. 27, 2006 (GB) .................................. 0621436.5

(51) Int. Cl.
*G06F 17/00* (2006.01)
*G07F 17/32* (2006.01)

(52) U.S. Cl.
CPC ............ *G07F 17/3223* (2013.01); *G07F 17/32* (2013.01); *G07F 17/323* (2013.01); *G07F 17/3239* (2013.01)
USPC .......................................................... 463/42

(58) Field of Classification Search
USPC ....................... 463/16–29, 40–42; 273/143 R
See application file for complete search history.

(56) References Cited

U.S. PATENT DOCUMENTS

| | | | | |
|---|---|---|---|---|
| 6,652,378 | B2 * | 11/2003 | Cannon et al. | 463/20 |
| 6,860,810 | B2 | 3/2005 | Cannon et al. | |
| 7,798,901 | B2 | 9/2010 | Nguyen et al. | |
| 8,509,553 | B2 * | 8/2013 | Ding | 382/238 |
| 8,606,227 | B2 * | 12/2013 | Karam et al. | 455/410 |
| 8,635,630 | B2 * | 1/2014 | Iyer et al. | 719/318 |
| 2006/0084488 | A1 | 4/2006 | Kinsley et al. | |
| 2008/0102916 | A1 | 5/2008 | Kovacs et al. | |
| 2009/0143141 | A1 | 6/2009 | Wells et al. | |

FOREIGN PATENT DOCUMENTS

| | | | |
|---|---|---|---|
| GB | 2395043 | A | 5/2004 |
| WO | 2004/095383 | A | 11/2004 |
| WO | 2005/020164 | A | 3/2005 |

OTHER PUBLICATIONS

EPO Communication pursuant to Article 94(3) EPC for European Patent Application No. 07821809.6, dated Mar. 5, 2014, 7 sheets.

* cited by examiner

*Primary Examiner* — Ronald Laneau
(74) *Attorney, Agent, or Firm* — Kenyon & Kenyon LLP

(57) ABSTRACT

A method of controlling a game program adapted to operate a game in a device is disclosed. The method comprises accessing configuration data defining one or more states or events which can occur at the device and which are not related to the game program, and specifying for each defined state or event a game action to be performed by the game program in response to the defined state or event. The occurrence of one of the defined states or events at the device is detected, and the game action specified in the configuration data for the detected state or event is performed in response to detection of the defined state or event.

21 Claims, 9 Drawing Sheets

ONLINE GAMING SYSTEM

CROSS-REFERENCE TO RELATED APPLICATIONS

This application is a continuation of U.S. patent application Ser. No. 12/447,439, filed May 18, 2010, which is the national stage of PCT/EP07/61446, filed Oct. 24, 2007, which claims benefit of GB 0621434.0, filed Oct. 27, 2006, and GB 0621436.5, filed Oct. 27, 2006.

The present invention relates to an online gaming system for online multiplayer games. Particular examples relate to an online gaming system operating over a mobile telecommunications network. Particular examples relate to wagering games, for example poker-type games and casino type games.

Online gaming systems typically provide multiple concurrent games in which players may participate. Games may be categorised into different game types and/or have game-related attributes which differ from game to game. Within a game type, there may be a large number of games, having the same attributes. Online gaming systems typically provide a menu system to allow players to select the game in which they wish to participate. This menu system may, for example, be referred to as a lobby, in particular in wagering games such as poker. Often, this is in the form of a hierarchical menu, where a player can select game types and game attributes and see a list of games of the selected type. The display of such menus typically requires a reasonably large screen space, and navigation can be cumbersome. These difficulties are exacerbated where the gaming system is provided on small-screen devices and/or devices with limited user interface capabilities, for example mobile devices, such as mobile telephones. Transmission of the menus and game lists to mobile devices can require substantial bandwidth, which given the relatively limited data transmission capabilities of such devices, can lead to an unacceptably slow service. The relatively high latency of mobile data connections also means that by the time a mobile device has received game details, the user has made a selection, and the selection has been transmitted back to the game server, the information in the lists may be out of date, and the selected game may no longer be available. Thus, existing gaming systems are typically not suited to the limited screen space, user input capabilities, bandwidth and latency of mobile devices and mobile connections.

Other limitations of current online gaming systems include: the inability to use anything other than direct interaction with the game to input instructions and initiate events; problems associated with loss of connection, a common occurrence when dealing with mobile communications; currently when the connection is lost, the user is generally automatically logged out of the game and will need to log back in and re-find the game to resume play; the difficulty in setting gaming preferences, especially when using a small-screen device such as a mobile phone; and other such problems.

The present invention, in its various aspects and features set out below, seeks to alleviate some of these problems.

Aspects and Features Relating to Detection of Observable States/Events

In a first aspect of the invention, there is provided a method of controlling a game program adapted to operate a game in a device, comprising: accessing configuration data defining one or more states or events which can occur at the device and which are not related to the game program, and specifying for each defined state or event a game action to be performed by the game program in response to the defined state or event; detecting occurrence of one of the defined states or events at the device; and performing the game action specified in the configuration data for the detected state or event in response to detection of the defined state or event.

In this way, a more flexible and efficient method of performing game actions in a wagering game can be provided. For example, by triggering game actions in response to states or events not related to the game, game actions can be triggered in a pseudo-random manner. This can improve the game experience. By providing configuration data specifying states or events and corresponding game actions, detection of relevant states/events and identification of appropriate game actions can be carried out more efficiently. Also, the triggering behaviour can be modified more easily (by changing the configuration data), which can provide flexibility.

The game program may be a wagering game program adapted to operate one or more wagering games.

In a further aspect, there is provided a method of controlling a game program provided in a device adapted to perform communications functions, comprising: detecting a communications event not related to the game program; determining one or more characteristics of the communications event; and performing a game action in relation to the game program in response to the detected communications event in dependence on the determined characteristics.

This can enhance the apparent pseudo-random nature of the triggering of game actions. By considering characteristics of a communications event when triggering a game action, greater flexibility can also be provided.

In a further aspect, the invention provides a method of controlling a wagering game program adapted to operate a wagering game in a device, comprising: receiving environmental information relating to a state or event pertaining to the device's environment (preferably from a sensor provided in the device); and performing a game action in relation to the wagering game in response to the received information.

In this way, conditions external to the device can be used to trigger game actions.

In a further aspect, the invention provides a method of controlling a game program adapted to operate a game in a device, comprising: receiving status information relating to an internal state of the device, the state not being related to the game program; determining whether the status information fulfils a predetermined criterion; and performing a game action in relation to the game in dependence on the outcome of the determination.

This allows internal status of the device to be used to trigger game actions.

In a further aspect, the invention provides a method of controlling a game program adapted to operate a plurality of games, comprising: detecting a state or event occurring in a first of the plurality of games; and performing a game action in relation to a second of the plurality of games in response to the detected state or event.

In this way, states or events in one game can be used to influence another, preferably in an apparently pseudo-random nature (the state or event in the first game preferably being unrelated to the second game or game action performed).

In a further aspect of the invention, there is provided a method of controlling a game program adapted to operate a game in a device, comprising: detecting a predefined combination of user interactions with the device, the user interactions not being related to the game; and performing a game action in relation to the game in response to detection of the combination of user interactions.

In this way, game events can be triggered in an unexpected way, improving the game experience.

In a further aspect, the invention provides a method of controlling a game program adapted to operate a game, comprising: detecting a predefined combination of states and/or events, the states or events not being related to the game; and performing a game action in relation to the game in response to the detected combination of states or events.

This provides greater flexibility in the types of conditions that may be detected and used to trigger game actions.

In a further aspect, the invention provides a method of controlling a game program adapted to operate a game, comprising: executing the game program to operate a game; during operation of the game, detecting a state or event not related to the game; performing a game action in relation to the ongoing game in response to the detected state or event; and continuing execution of the game program and operation of the game following the performed game action. Thus, the game action preferably affects subsequent game events.

This allows a running game to be influenced by unrelated states or events, which can result in a more surprising and entertaining play experience (the game action may, for example, comprise submitting a wager in a wagering game).

In a further aspect, there is provided a method of controlling a wagering game program adapted to operate a wagering game, comprising: detecting a state or event not related to the wagering game; and in response to the detected state or event, submitting a wager in the wagering game in relation to a predefined game event or outcome and/or with a predefined wager amount (the game event/outcome and/or wager amount may be defined in configuration data).

By using predefined game outcome and wager amount, a wager can be submitted (a bet placed) without user input, which can result in more efficient operation of the program.

In a further aspect, the invention provides a method of controlling a game program adapted to operate a game, comprising: detecting a state or event not related to the game; and in response to detecting the state or event, determining randomly or pseudo-randomly (preferably in accordance with a predefined probability) whether to perform a game action in relation to the game; and performing the game action in response to a positive determination.

This can introduce a greater degree of unpredictability into the triggering of game actions, improving the game experience.

In a further aspect, the invention provides a method of controlling a game program adapted to operate a game, the game program operating in accordance with stored configuration data, comprising: detecting a state or event not related to the game program; and modifying the configuration data for the game program in response to the detected state or event.

This can provide greater flexibility in controlling the game program. Once the configuration data has been modified in response to the state or event, the changes will be effective for future runs of the game program and thus influence its operation (until the configuration data is changed again).

In a further aspect of the invention, there is provided a method of controlling a game program adapted to operate a game in a device, comprising: detecting a state or event relating to the game; and performing a device action external and unrelated to the game program in response to the detected state or event.

This can enable control of the device in a surprising and interesting manner, and can improve the game experience.

In a further aspect of the invention, there is provided a method of controlling a wagering game program adapted to operate a wagering game, comprising: receiving information not related to the wagering game; and performing a game action in relation to the wagering game in response to the information.

In this way, a more flexible and efficient method of performing game actions in a wagering game can be provided. For example, by triggering game actions in response to information not related to the wagering game, game actions can be triggered in a pseudo-random manner. This can improve the game experience.

The term wagering game preferably refers to a game played for real or virtual tokens of value, in particular for real or virtual money ("play money"), involving wagers of a given amount of real or play money submitted in respect of given game events or outcomes.

The received information preferably relates to an observable, and receiving the information comprises detecting the observable. The term "observable" preferably relates to something that can be observed or detected, in particular to a state or event, or a condition. The observable may be internal or external to the game program or any device at which the program operates.

Accordingly, the information preferably relates to a state or event, and receiving the information comprises detecting the state or event. The game program preferably operates on a device, for example a mobile communications device, and the observable, state or event preferably occurs at or within the device and is detected by the device and/or game program.

Accordingly, in a further aspect, the invention provides a method of controlling a wagering game program adapted to operate a wagering game, comprising: detecting a state or event not related to the wagering game; and performing a game action in relation to the wagering game in response to the detected state or event.

The observable, state or event may represent a combination of observables, states and/or events as described in more detail below.

The various aspects set out above may be combined in any suitable manner. Some preferred features of the various aspects are set out below. These may be applied to any of the above aspects as appropriate.

Preferably, the information, observable, state or event is not related to the (wagering) game program. In this way, game actions can be triggered by events occurring outside the game program, which can enhance the pseudo-random nature of the triggered actions and provide an improved game experience for the user.

For example, the (wagering) game program may be one of at least two programs provided in a device, and the information, observable, state or event may be related to another of the at least two programs. The observable, state or event may relate to the initiation or termination of, or an event occurring in, another of the at least two programs. In this way, events occurring in another program can influence game actions in the wagering game program.

Preferably, the (wagering) game program is provided on a device connected to a communications network (for example a mobile telephone), and the information, observable, state or event relates to an interaction between the device and the network.

In particular, the information, observable, state or event preferably relates to a communications event, the method comprising detecting the communications event. In this way, where the device is a mobile telephone or the like, events related to the primary function of the communications device can be used to control the game program. Since the communications events are unrelated to the game but are expected to occur relatively frequently, an effective pseudo-random triggering mechanism for triggering game actions can be provided. The communications event may, for example, comprise receipt of a communication, preferably from a predefined source. Alternatively, the communications event may comprise initiation or transmission of a communication, preferably to a predefined destination or recipient.

The communication preferably comprises one or more of: a message, a text message, a picture message, a voice message, a video message, an instant messenger service message, an e-mail message, a real-time communications session, a voice call, and a video call. Thus, in an example, the method may comprise initiating a game action in response to receipt of a text message or telephone call from a selected person.

The information, observable, state or event may relate to a user interaction not intended for the (wagering) game program. For example, the user interaction may comprise a predefined key press or a predefined combination or sequence of key presses, preferably regardless of the context in which the key presses occur.

More generally, the information, observable, state or event may relate to a predefined combination of user interactions, the method comprising detecting the interactions. These may comprise key presses or other interactions. The combination may comprise a plurality of substantially simultaneous user interactions, and/or a predefined sequence of user interactions. The method would then comprise detecting the interactions substantially simultaneously or in the defined sequence. The combination of user interactions may be defined in modifiable configuration data, preferably modifiable by the user and/or remotely over a network to which the device can be connected.

The (wagering) game program may be provided in a device, and the information, observable, state or event may relate to a state or event (perhaps environmental in origin) detected at a sensor connected or connectable to, or associated with, the device. The method may comprise receiving data from the sensor, and detecting the event if the data fulfils a predetermined criterion, for example by exceeding a defined threshold (for simple numerical data) or by matching a defined pattern (for complex data, for example image data or sound data). The sensor may form part of a user interface element of the device. The sensor may for example be one of: an image sensor, a temperature sensor, a motion sensor, a position sensor, and a microphone. The information, state or event may relate to the current time. For example, a game action could be performed at a predetermined time of day.

The (wagering) game program may be adapted to operate a plurality of concurrent (wagering) games, the method comprising detecting a state or event related to a first of the plurality of games (and not related to a second of the plurality of games), and performing a game action in relation to the second of the plurality of games in response to the detected state or event. In this way, one game can influence game actions in another game. This can provide improved flexibility and can allow for efficient control of the game program. For example, a user may take an action in a first game, in response to which an action is automatically performed in the second game.

The first and second games may run concurrently. They are preferably different types of games (e.g. a poker game and a roulette game).

Where the games are wagering games, the state or event related to the first of the plurality of wagering games may, for example, comprise a wager submitted in the first of the plurality of wagering games. The state or event related to the first of the plurality of wagering games may comprise the end of or withdrawal by the user from the first of the plurality of wagering games, or the end of or withdrawal by the user from a round in said game (for example, in poker, the end of a hand due to a player winning the hand, or the withdrawal by the player from the hand by folding). In this way, a game action in one game can automatically be triggered in response to the player' involvement in another game ceasing at least temporarily (in other words in response to a period of inactivity or lull in the other game); for example by starting a game or submitting a wager. As a specific example, the first game may be a poker game and the second game a roulette game. If the player folds in the poker game, this could trigger a bet being placed in the roulette game. This approach can be used, for example, to fill the waiting time between hands in the poker game, and more generally, to maximise the user's active playing time.

Thus, the state or event occurring in a first of the plurality of games may relate to or indicate a period of inactivity for the player in the first game, the method then preferably comprising performing the game action after the start of the period of inactivity. Performing a game action may comprise initiating the second game.

More generally, the method may comprise initiating a predefined second game during a period of inactivity for the player in the first game, the first game preferably being a multiplayer game, the second game preferably being a single-player game. In this way, more of the player's time can be spent playing, rather than waiting for something to happen in their main game.

Preferably, the method comprises returning the player to the first game at the end of the period of inactivity or at the end of the second game (alternatively, at the end of the second game, a further game could be started if the period of inactivity in the first game continues). This can simplify, operation of the games for the user, especially on small devices with limited user interface capability.

The information, observable, state or event may relate to a predefined combination of observables, states and/or events, the method comprising detecting the occurrence of the predefined combination of states and/or events, and performing the game action in response to the occurrence of the combination of states and/or events. In this way, greater flexibility can be provided. For example, an action may be performed in response to a predefined event occurring within a predefined time period (as determined by reference to a clock), and/or whilst the player is at a predefined location (as determined by reference to a position sensor). This can provide greater flexibility in how game actions may be triggered.

The states or events of the combination are preferably unrelated to each other, and may be detected in a defined sequence, or close in time or substantially at the same time, as described above more specifically for combinations of user interactions.

The observables, states or events used to trigger game actions, and the game actions to be triggered in response to the observables, states or events are preferably configurable by the user. Preferably the user may define one or more observables or combinations of observables, and the game event to be performed in response to each. This configuration is preferably stored in the form of preference data or configuration data. The terms configuration data and preference data are generally used synonymously herein, unless the context requires otherwise.

Accordingly, the method preferably comprises accessing configuration data for a user of the wagering game program, the configuration data defining a combination of states and/or events and specifying a game action to be performed in response to the specified combination of states and/or events, the method further comprising, in response to detecting the defined combination of states and/or events, performing the specified game action.

In this way, greater flexibility can be provided, allowing a user to control how game events are triggered.

The states/events of the combination may be required to occur (substantially) simultaneously in order to trigger the game action, or may be required to occur in a defined sequence. This is typically defined in the configuration data.

Performing a game action may comprise initiating the (wagering) game program. Thus, the wagering game program may, for example, be initiated in response to receipt of a telephone call, or at a predetermined time of day.

Performing a game action may alternatively or additionally comprise performing an action in the game program. For example, performing a game action may comprise initiating a wagering game. Thus, receipt of a call from a predetermined source could initiate a poker game.

Performing a game action may alternatively or additionally comprise performing an action in the game. For example, receipt of a call from a predetermined source could initiate the spin of a wheel in a roulette game (or could first initiate the roulette game and then initiate the spin of the wheel). Alternatively or additionally, performing a game action may comprise submitting a wager (in the case of a wagering game). Thus, in the above example, the receipt of the phone call could trigger a wager being placed on a predefined number in the roulette game and could subsequently initiate the spin of the roulette wheel in the game. The wager is preferably submitted in relation to a predefined game event or outcome and is preferably submitted with a predefined wager amount. Thus, continuing the above example, the user may have specified a wager of £1 (the wager amount) to be placed on number 7 (the game event or outcome) in a roulette game in response to receipt of a telephone call from a certain friend. Whenever the friend calls, the roulette game is initiated and the predefined wager is submitted. Generally speaking, the method may comprise performing a plurality of game actions in response to detecting the observable, state or event, in particular a defined sequence of game actions.

Performing a game action may comprise transmitting a message to another user, the message comprising an invitation to join a game and/or configuration data for configuring the other user's game program.

The method may comprise selecting one of a plurality of game actions in dependence on the received information or the detected state or event, and performing the selected game action. Thus, different actions may be performed for different events. As mentioned above, this may be governed by user preference data. Thus, the method may comprise accessing preference or configuration data for a user of the game program, the preference data specifying a game action to be performed in response to the detected state or event, and performing the specified game action. Preferably the preference data specifies for each of a plurality of states or events not related to the game program, a game action to be performed in response to the state or event, the method comprising executing the game action specified for the detected state or event in the preference data in response to the detection of the state or event. The preference data may specify for each of a plurality of combinations of states and/or events not related to the game program, a game action to be performed in response to the occurrence of the combination of states and/or events, the method comprising executing the game action specified for the detected combination of states and/or events in the preference data in response to the detection of the combination of states and/or events.

The method may comprise accessing preference data for a user of the game program, the preference data specifying one or more parameters for a game action to be performed in response to the state or event, and wherein performing a game action comprises performing the game action using the specified parameters. In the case of a wagering game, the method may comprise accessing preference data for a user of the game program, the preference data specifying one or more wager parameters for a wager to be submitted in response to the state or event, and wherein performing a game action comprises submitting a wager in accordance with the specified wager parameters. The one or more wager parameters may comprise one or more of: a game or game type in respect of which a wager is to be submitted, a game event or outcome in respect of which a wager is to be submitted, and a wager amount.

By using preference or configuration data to determine the observables, states or events, and the game actions to be performed (possibly with specified parameters) in response to those observables, states or events, the user can be provided with greater control over how game actions are triggered. The method may comprise modifying stored preference or configuration data in response to input from a user of the game program, the preference or configuration data defining e.g. one or more states or events and/or one or more actions to be performed in response to the defined states or events. In this way, the user can modify the defined triggers and actions. Alternatively or additionally, the method may comprise modifying the configuration data in response to information received from a communications network to which the device is connectable. The method may comprise receiving an indication from a user of the game program to cease responding to a given state or event or to any state or event; the method comprising no longer performing a game action in response to the given state or event or to any state or event after receipt of the indication. In this way, the user can disable given triggers at any time, or opt out of the triggering mechanism altogether. Preferably, the user can activate or deactivate individual triggered actions or the entire triggering mechanism at any time. In this way, the user can ensure that game actions are only triggered at appropriate times, for example whilst the user is not at work.

The method may comprise performing the game action substantially immediately (or directly) in response to detection of the observable, state or event. Alternatively, the method may comprise performing the game action a time period after detection of the state or event. This can enhance the apparent pseudo-random nature of the triggered actions. The time period may be predetermined, for example fixed or specified in configuration data, or may be selected randomly. The method may comprise determining randomly or pseudo-randomly (for example based on a predefined probability) whether or not to perform the game event in response to detection of the observable, state or event, the game action being performed or not being performed accordingly.

Where the device has communications functions, the state or event may be a communications event. The method then preferably comprises determining one or more characteristics of the communications event, and performing a game action in dependence on the determined characteristics.

This can provide a greater degree of control of how actions are triggered.

Performing a game action in dependence on the determined characteristics preferably comprises performing a game action if the determined characteristics meet a predetermined criterion. One or more characteristics may relate to the source or recipient of a communication, for example a name, telephone number or the like. Alternatively or additionally, one or more characteristics may relate to the content of a communication. This may for example be text content of a text message, sound content of a voice call/message, or image content of a picture message or video call/message.

Accordingly, the method may comprise analysing the content of the communication, and performing a game action in dependence on the outcome of the analysis. This may for example involve text analysis, image pattern recognition (e.g. face recognition), or sound recognition (e.g. voice recognition). By enabling actions to be triggered in dependence on the content of a communication, greater flexibility can be provided, and a variety of interesting applications become possible, such as triggering an event in response to a certain word in a text message, or a certain voice being recognised.

Performing a game action preferably comprises initiating the game program and/or performing an action in the game program. The method preferably comprises accessing preference or configuration data for a user of the game program, the preference data defining at least one communications event, the method comprising performing a game action in response to detection of one of the defined communications events. The preference data preferably specifies, for each defined communications event, a game action to be performed in response to the communications event, the method comprising, in response to detecting one of the defined communications events, performing the game action specified for the defined communications event in the preference data.

The communications event preferably comprises receipt of a communication, preferably from a predefined source, or initiation or transmission of a communication, preferably to a predefined destination or recipient. The source or destination to which the communications event relates is preferably defined in the preference data. The communication may comprise one or more of: a message, a text message, a picture message, a voice message, a video message, an instant messenger service message, an e-mail message, a real-time communications session, a voice call, and a video call.

The detected observable, state or event may relate to an internal state of the device (the state typically not being related to the game program). In that case, the internal state may relate to the operational status of the device or a device component, preferably to one of: network signal strength, remaining battery power, screen brightness or speaker volume. The internal state may alternatively relate to the status of a further program or application running in the device which is not related to the game program.

The observable, state or event may relate to the current time.

As previously mentioned, the game program may operate in accordance with stored configuration data, in which case the method may comprise modifying the configuration data in response to detecting the observable, state or event. Instead of or in addition to influencing the operation of an individual game, this can allow the configuration or set-up of a game to be controlled in response to observables. The configuration data may relate to the visual appearance of the game, or to a default or preferred game type, or to default wager parameters for a wagering game (or a combination). As mentioned previously, the state or event may, for example, relate to the time and/or the location of the device running the program, or to a sensor input received at the device. It may also comprise a communications event.

Configuring the game program in response to observables, states or events can be particularly advantageous, since it can allow the game to be adapted to the user or device's current circumstances (such its location), to thereby improve the game experience.

In another aspect mentioned above, the method may comprise detecting a state or event relating to the game (for example a predetermined game outcome such as a win) and performing a device action external and unrelated to the game program in response to the detected state or event. The device action may be a communications action, such as sending a message or initiating a call. This can enable the implementation of novel entertainment functionality.

The invention also provides a computer program or computer program product comprising software code adapted, when executed on a data processing apparatus, to perform any method set out above.

In a further aspect, the invention provides a device for running a game program adapted to operate a game, comprising: storage (e.g. comprising a memory or other storage device) for storing configuration data defining one or more states or events which can occur at the device and which are not related to the game program, and specifying for each defined state or event a game action to be performed by the game program in response to the defined state or event; a detecting component (e.g. comprising a processor) adapted to detect occurrence of one of the defined states or events at the device; and a processing component (e.g. comprising a processor) adapted to perform the game action specified in the configuration data for the detected state or event in response to detection of the defined state or event.

In a further aspect, the invention provides a device adapted to perform communications functions and to run a game program, the device comprising: a detecting component (e.g. comprising a processor) arranged to detect a communications event not related to the game program and to determine one or more characteristics of the communications event; and a processing component (e.g. comprising a processor) arranged to perform a game action in relation to the game program in response to the detected communications event in dependence on the determined characteristics.

In a further aspect, the invention provides a device for running a wagering game program adapted to operate a wagering game, the device comprising: a sensor for receiving environmental information relating to a state or event pertaining to the device's environment; and a processing component (e.g. comprising a processor) adapted to perform a game action in relation to the wagering game in response to the received information.

In a further aspect, the invention provides a device for running a game program adapted to operate a game in the device, comprising: a status monitor (e.g. comprising a processor) for receiving status information relating to an internal state of the device, the state not being related to the game program; and a processing component (e.g. comprising a processor) adapted to determine whether the status information fulfils a predetermined criterion, and to perform a game action in relation to the game in dependence on the outcome of the determination.

In a further aspect, the invention provides a device for running a game program adapted to operate a plurality of games, comprising: a detecting component (e.g. comprising a processor) for detecting a state or event occurring in a first of the plurality of games; and a processing component (e.g. comprising a processor) adapted to perform a game action in relation to a second of the plurality of games in response to the detected state or event.

In a further aspect, the invention provides a device for running a game program adapted to operate a game, comprising: a detecting component (e.g. comprising a processor) for detecting a predefined combination of user interactions with the device, the user interactions not being related to the game; and a processing component (e.g. comprising a processor) arranged to perform a game action in relation to the game in response to detection of the combination of user interactions.

In a further aspect, the invention provides a device for running a game program adapted to operate a game, comprising: a detecting component (e.g. comprising a processor) for detecting a predefined combination of states and/or events, the states or events not being related to the game; and a processing component (e.g. comprising a processor) adapted to perform a game action in relation to the game in response to the detected combination of states or events.

In a further aspect, the invention provides a device for running a game program adapted to operate a game, the device comprising a processor arranged to: execute the game program to operate a game; during operation of the game, detect a state or event not related to the game; perform a game action in relation to the ongoing game in response to the detected state or event; and continue execution of the game program and operation of the game following the performed game action.

In a further aspect, the invention provides a device for running a wagering game program adapted to operate a wagering game, comprising: a detecting component (e.g. comprising a processor) for detecting a state or event not related to the wagering game; and a processing component (e.g. comprising a processor) arranged, in response to the detected state or event, to submit a wager in the wagering game in relation to a predefined game event or outcome and with a predefined wager amount.

In a further aspect, the invention provides a device for running a game program adapted to operate a game, the device comprising: a detecting component (e.g. comprising a processor) for detecting a state or event not related to the game; and a processing component (e.g. comprising a processor) arranged, in response to detecting the state or event, to determine randomly or pseudo-randomly whether to perform a game action in relation to the game, and to perform the game action in response to a positive determination.

In a further aspect, the invention provides a device for running a game program adapted to operate a game, comprising: storage (e.g. comprising a memory or other storage device) for storing configuration data, the game program operating in accordance with the stored configuration data; a detecting component (e.g. comprising a processor) for detecting a state or event not related to the game program; and a processing component (e.g. comprising a processor) adapted to modify the configuration data for the game program in response to the detected state or event.

In a further aspect, the invention provides a device for running a game program adapted to operate a game, comprising: a detecting component (e.g. comprising a processor) for detecting a state or event relating to the game; and a processing component (e.g. comprising a processor) arranged to perform a device action external and unrelated to the game program in response to the detected state or event.

The invention also provides a device as set out in relation to any of the above aspects, further adapted to perform any method as set out above, and, more generally, apparatus (preferably in the form of a mobile communications device or mobile phone), comprising means for performing any method as set out above.

The components described above in relation to various device aspects (for example detecting and processing components) may be in the form of or include software components, for example parts of a program such as a game program, for execution on a processor.

Though the various aspects set out herein are generally set out in relation to games programs, they may also be provided in the context of other types of programs. Thus, for example, the invention may additionally provide a method of controlling a program adapted to perform a function in a device, comprising: accessing configuration data defining one or more states or events which can occur at the device and which are not related to the program or its function, and specifying for each defined state or event a game action to be performed by the game program in response to the defined state or event; detecting occurrence of one of the defined states or events at the device; and performing the game action specified in the configuration data for the detected state or event in response to detection of the defined state or event.

The other aspects set out above and below may be modified/generalised in a similar manner to apply to non-game programs.

Aspects and Features Relating to Player Allocation

In a further aspect of the invention, there is provided an online gaming system adapted to provide access to a plurality of (preferably concurrent) multiplayer games, comprising a player allocation component adapted to: access information relating to the history of play or state of play in one or more of the plurality of games; select one of the plurality of games for the player in dependence on the information; and allocate or join the player to the selected game.

In this way, players can be efficiently joined to games without the need for complicated menu-based lobby systems, thus reducing the amount of data that needs to be transmitted to a player and simplifying the user interface. Joining a player to a game preferably comprises allocating the player to the game and/or connecting the player to the game, specifically taking the player to the allocated game, e.g. by configuring a player interface to display and provide access to the game.

The allocation component is preferably adapted to allocate a player to a game in response to one or more of: receiving a request to join a game from the player; the end of an existing game in which the player was participating (for example due to the operation of game rules or due to a technical problem); disconnection of the player from an existing game in which the player is participating; and the current number of players of an existing game in which the player is participating falling below a defined threshold.

In this way, the player's play time whilst connected to the system can be maximised.

The online gaming system preferably operates the plurality of online games, and preferably operates over a mobile telecommunications network, with players interacting with the system using mobile devices connected to the mobile telecommunications network.

The player allocation component is preferably adapted to select the one of the plurality of concurrent multiplayer games in dependence on one or more predetermined rules. This can provide greater control over the allocation of players to games. The games are preferably wagering games.

Accordingly, in a further aspect, the invention provides an online gaming system for use with a mobile telecommunications network, adapted to provide access to or operate a plurality of concurrent multiplayer wagering games for participation by players using mobile devices connected to the mobile telecommunications network, comprising a player allocation component adapted to select one of the plurality of concurrent multiplayer wagering games for a given player, preferably in dependence on one or more predetermined rules; and join the given player to the selected game.

A rule may specify a type of game or attribute(s) or characteristic(s) of a game. If a game matching the type, attribute(s) or characteristic(s) is available, it may be selected in accordance with the rule. If there are multiple rules, then they are preferably applied in a defined priority order (e.g. if there is no game available matching a first rule, then the next rule is considered etc.) as discussed in more detail below. Attributes or characteristics may include the number of players currently in the game, positions available in the game, and the like.

Thus, the one or more rules preferably include selecting one of a plurality of games in dependence on the number of players already allocated to one or more of the games. This can help distribute players more evenly. Preferably, the rules comprise selecting a game having a current number of players within a defined range in preference to a game having a current number of players outside the defined range. In this way, player numbers can be controlled more effectively. The range is preferably between approximately one third and approximately two thirds of a maximum number of players defined for each game. For a six-player game, the range is preferably between two and three players. In this way, an efficient balance of player numbers can be achieved. For the same reason, the one or more rules preferably include selecting a game having a current number of players below the defined range in preference to a game having a current number of players above the defined range. The allocation component preferably selects from those games having at least one player already allocated.

Preferably, the allocation component seeks to maximise the number of games having a current number of players at or near a given defined threshold, preferably between half and three quarters of a maximum number of players defined for the games, more preferably two thirds of the maximum number (for example, four players for six-player games). In this way, an efficient balance can be achieved, and the collapse of existing games due to players leaving can be avoided to some extent.

As mentioned previously, the player allocation component is preferably adapted to evaluate the state or history of play of one or more of the plurality of games, and to select one of the plurality of games in dependence on the outcome of the evaluation. This can enable the selection of a more appropriate game for the player, thus improving the player's experience and reducing the risk of the player subsequently leaving the game after only a short time.

Each game may have a defined number of player positions to which players can be allocated, in which case the player allocation component is preferably adapted to select one of the plurality of games in dependence on the player positions not yet allocated to players in one or more of the games. This can assist in identifying an appropriate game for the player, in particular where player positioning is relevant to game play. Thus, the player allocation component is preferably adapted to evaluate, for one or more of the plurality of games, the player position or positions available in each game in relation to the state of play in the game and to select a game in dependence on the outcome of the evaluation. The one or more rules preferably include selecting a game having an available player position meeting a predetermined criterion in preference to a game not having an available player position meeting the predetermined criterion. Where the game is a poker-type game (or other game with forced bets), the one or more rules may, for example, include selecting a game having an available player position which is not between the blinds (forced bets) in preference to a game having only available positions between the blinds. By basing the game selection on available (i.e. not currently allocated) player positions, as they relate to the state of play, the system can avoid giving unfair advantages or disadvantages to the joining player and/or to existing players of a game.

The player allocation component is preferably adapted to evaluate, for one or more of the plurality of games, the duration of play of one or more players already participating in the games, and to select one of the plurality of games in dependence on the outcome of the evaluation. Preferably, the rules include selecting a game in which players have been playing for longer in preference to a game where players have been playing for a shorter time. For example, the allocation component may determine the average length of play by players in certain games, and select a game with a higher play time average in preference to a game with a lower play time average. In this way, the formation of stable games can be encouraged, and the risk of allocating the player to a short-lived game can be reduced.

The allocation component may further be adapted to analyse the style of play in one or more of the plurality of games, and to select a game having a style of play similar to a game in which the player was previously participating. This can improve the play experience for the player, and reduce the risk of the player becoming dissatisfied and disconnecting from the system. The allocation component may, for example, be adapted to analyse data representative of one or more past play events in a given game to determine a characteristic or to access a precomputed characteristic for the game, and to compare the given game to the game in which the player was previously participating in relation to the determined or precomputed characteristic. The characteristic preferably relates to one or more of: the speed of play in the game, wagers placed in the game, the percentage of players to reach a defined stage in the game or in individual rounds of the game, or, in a poker-style game, the percentage of players to see the flop or other community cards.

Where there are multiple rules, the allocation component is preferably adapted to apply the rules in a predetermined order (e.g. higher-order rules being applied before lower-order rules, until a game has been allocated). This can allow complex allocation procedures to be specified.

Where each game has a defined number of player positions, the player allocation component is preferably further adapted to select an available player position for the player and assign the player to the selected player position when joining the player to the game. This can avoid creating unfair advantages or disadvantages as previously discussed, and can also simplify the user interface. The allocation component may select a game for the player based on the available player positions, in particular to select a game having a player position matching a defined criterion, as already discussed, and then select a player position within the game matching that criterion accordingly. The player allocation component is preferably adapted to select an available player position in dependence on the state of play of the game. Where the game is a poker-type game (or other game with forced bets), the player allocation component is preferably adapted to select an available player position which is not between the blinds (forced bets) in preference to a player position between the blinds.

The allocation component may further be adapted to reallocate players between running games so as to balance player numbers in the games. This can enable more efficient operation of the system and improve the overall play experience for players. The allocation component is preferably adapted to: identify a current game which meets a predetermined termination criterion; and for each player currently participating in the identified game, select another of the plurality of concurrent games and join the player to the selected game, thereby terminating the identified game. This can enable efficient management of the games. The predetermined termination criterion may include, for example, the number of players participating in the game falling below a predefined threshold.

The allocation component is preferably adapted to allocate a player to a scheduled game for which the player has previously registered before the start of the scheduled game. The scheduled game, may for example, be a scheduled tournament, and may be for a scheduled time, or may be scheduled to commence as soon as a sufficient number of players have registered.

The allocation component may be adapted, before the start of the scheduled game, to identify a game in which the player is currently participating, and to automatically remove the player from the game and/or end the game (preferably depending on whether the game is a single-player game or a multiplayer game), preferably at the end of a game round, or at another appropriate time so as not to disrupt the game.

Preferably, the allocation component is further adapted to: access stored preference data defining one or more game preferences for the player; and select one of the plurality of games in dependence on the preference data. This can allow a more appropriate game to be selected for the player, in particular where different types of game are being provided. Thus, the one or more predetermined rules may include a rule to select a game matching the player's preferences if available. Preferably, the allocation component is adapted to identify a plurality of games matching the game preferences for the player, and to select one of the plurality of identified games in dependence on one or more of the predetermined rules (and/or other selection criteria described above).

The various selection rules and criteria described above may be combined in any appropriate combination. Typically, where multiple rules or criteria are used, they are applied in a defined priority order. Preferably, as already mentioned, games are selected initially based on the player's preferences. If multiple matching games exist, then one or more of the above rules and criteria are applied in a defined priority order to select one of the games which matches the player's preferences. All the various criteria described herein may be considered to be rules (and vice versa).

In a further aspect, the invention provides an online gaming system adapted to provide access to or operate a plurality of concurrent multiplayer games, comprising a player allocation component adapted to: receive a request from a player to join a game; access stored preference data defining one or more game preferences for the player; identify one or more of the plurality of games matching the preference data; select, if two or more games matching the preference data are identified, one of the identified games in dependence on one or more predetermined rules (such as one or more of the rules and other selection criteria mentioned above), and join the player to the selected game.

In this way, a player can be quickly joined to an appropriate game, without having to specify the type of game in which the player wishes to participate. This can simplify the user interface and provide increased efficiency.

Preferably, each game is associated with one or more attributes, the allocation component being adapted to compare the attributes of one or more games to the player's game preferences and to select a game in dependence on the outcome of the comparison. Each game may alternatively or additionally be associated with a game type (possibly from a defined set of game types); the game preferences specifying one or more preferred game types, the allocation component being adapted to select a game having a game type matching one of the player's preferred game types. One or more of the game attributes may define the game type. Game attributes or types may, for example, specify game variants or rules, or specific parameters of a given game such a betting limits or maximum player numbers. Using this approach, players can more accurately define their preferred types of game.

The allocation component may be adapted to select a game in dependence on the players participating in one or more of the games. For example, the player preferences may specify one or more other players, the allocation component being adapted to preferentially select a game in which one or more of the specified players are currently participating. In this way, a player can be taken automatically to a game in which designated other players (e.g. friends) are playing.

The player preferences may specify a plurality of preferred game types and an order of preference associated therewith, the allocation component being adapted to select a game in accordance with the specified order of preference. In this way, a player can still be automatically allocated to a game even when their most preferred game type is not available, making the allocation process more efficient and easier for the user.

The allocation component may be adapted, where no game matching the player's preferred game type is available, to add the player to a queue associated with that game type. The allocation component is then preferably further adapted to identify when a game matching the player's preferred game type becomes available, and to join the queued player to the identified game. This can remove the need for further interaction by the user in the situation where a matching game is not immediately available. Alternatively, the allocation component may be adapted, where no game matching the player's game preferences is available, to create a new game, and to allocate the player to the created game.

The online gaming system preferably further comprises a preference management component adapted to receive preference data from a player device, and to update stored preferences for the player in dependence on the received preference data.

In a further aspect, the invention provides an online gaming system adapted to provide access to or operate a plurality of concurrent multiplayer wagering games, comprising: a connection management component adapted to receive a connection request from a player and connect the player to the system in response to the connection request; and an allocation component adapted to select one of the plurality of concurrent multiplayer wagering games for the newly connected player (in response to the connection request), and join the newly connected player to the selected game. The allocation component is preferably adapted to perform the selection and joining steps after the player has been connected to the system without further interaction by the player. In this way, a very simple and efficient way of connecting to the system and joining a game can be provided, which can maximise the time spent playing and avoid the need for the player to navigate complex menus in order to play. Selection of a game is preferably based on preferences, rules and/or criteria as already mentioned.

The above aspects may be combined in any suitable manner. The allocation component of each aspect (which may take the form of or comprise a processor, appropriately programmed) may also be provided as an independent aspect of the invention.

In a further aspect the invention provides a method of (or a system having means for or being adapted for, or a computer program product being adapted for) allocating a first player to a game in an online gaming system providing access to a plurality of multiplayer games, the method comprising: accessing information relating to the first player and specifying one or more other players; identifying at least one of the other players as being available to participate in a game; and allocating the first player and the identified other player to one of the plurality of games in response to identifying availability of the other player.

In this way, a player can be automatically allocated to a game when his friends become available to play. Allocating may comprise allocating all the relevant players and/or starting a new game. If the player is currently playing a game that game may be terminated automatically (preferably at an appropriate point so as to reduce unwelcome disruption). Players may have preferred games or game types configured, and allocation may occur only when the game to be played with friends has been allocated a higher preference than a game the player is currently playing.

Preferably, identifying a player comprises monitoring whether the player is connected to the online gaming system, whether the player is currently participating in a game and/or the type of game the player is currently participating in. Again, whether the other player is considered available may depend on that player's preferences.

In a further aspect, the invention provides a method of (or a device or system having means for or being adapted for, or a computer program product being adapted for) registering a new user for an online gaming system using a device connected to the online gaming system, the online gaming system being arranged to operate a plurality of online games, the method comprising: selecting one of the plurality of games for the new user; displaying the selected game to the user on a screen associated with the device; and displaying a registration interface for obtaining registration information from the user on the screen; wherein the registration interface is displayed at the same time as the selected game thereby allowing the user to view the game during registration.

This can make the registration process more interesting for the user.

The method preferably comprises allowing the user to participate in the displayed game following (immediately after) completion of the registration process. This can reduce the delay between completing registration and starting to play. Preferably, the registration interface and selected game are displayed in separate regions of the screen and/or the registration interface is displayed at least partially superimposed on the selected game.

In a further aspect, the invention provides a method of allocating a player to a game in an online gaming system providing access to a plurality of concurrent multiplayer games, the method comprising: accessing information relating to the history or state of play in one or more of the plurality of games; selecting one of the plurality of games for the player in dependence on the information; and allocating the player to the selected game.

In a further aspect, the invention provides a method of joining a player to a game in an online gaming system provided over a mobile telecommunications network and providing access to a plurality of concurrent multiplayer wagering games for participation by players using mobile devices connected to the mobile telecommunications network, the method comprising: selecting one of the plurality of concurrent multiplayer wagering games for a given player in dependence on one or more predetermined rules; and joining the given player to the selected game.

In a further aspect, the invention provides a method of allocating a player to a game in an online gaming system providing access to a plurality of concurrent multiplayer games, the method comprising: receiving a request from a player to join a game; accessing stored preference data defining one or more game preferences for the player; identifying one or more of the plurality of games matching the preference data; if two or more games matching the preference data are identified, then selecting one of the identified games in dependence on one or more predetermined rules; and allocating the player to the identified or selected game.

In a further aspect, the invention provides a method of allocating a player to a game in an online gaming system providing access to a plurality of concurrent multiplayer games, the method comprising: receiving a connection request from a player; connecting the player to the system in response to the connection request; selecting one of the plurality of concurrent multiplayer wagering games for the newly connected player in response to the connection request; and joining the newly connected player to the selected game.

The invention also provides a computer program or computer program product adapted, when executed on a data processing apparatus, to perform a method according to any of the above method aspects.

Disconnection Protection Aspects and Features

In a further aspect of the invention, there is provided a method of operating an online multiplayer game, wherein a plurality of players participate in the game using (preferably mobile) client devices connected to a game server over a communications network (preferably a mobile telecommunications network), the method comprising: monitoring the state of the connection of each client device to the game server; in response to detecting the disconnection of a client device associated with a given player from the game server, pausing the game; and in response to the disconnected client device reconnecting to the game server: joining the given player to the paused game; and resuming the game with the given player.

In this way, disruption to a game due to disconnection of a player can be avoided. Disconnections are particularly common where an online game is provided over a mobile telecommunications network to players using mobile communications devices such as mobile telephones. In that case, disconnections can, for example, arise due the player receiving a call, or due to loss of signal (e.g. the player entering a tunnel). Upon reconnecting, the user is preferably automatically taken to the game he was last playing to simplify and accelerate the reconnection process.

To avoid the game being paused indefinitely (for example if the client device cannot or does not attempt to reconnect), the method preferably comprises performing the joining and resuming steps if the disconnected client device reconnects to the game server before expiry of a predetermined time period. Preferably, if the disconnected client device does not reconnect to the game server within a predetermined time period, the method comprises removing the given player from the game and/or resuming the game without the given player.

Where the game is a turn-based game, the method preferably comprises pausing the game at the player's turn after detecting disconnection of the player's client device. In this way, the game can continue after disconnection until it is the disconnected player's turn, which can reduce disruption to other players. For efficiency, the method may comprise pausing the game at the player's turn only if the player has not reconnected in the meantime.

The disconnection is preferably an involuntary disconnection. Thus, the above steps are preferably not performed in response to a deliberate disconnection from the service, for example by the user selecting to leave the game.

To reduce disruption to other players, the method preferably further comprises, in response to detecting the disconnection, displaying an indication to one or more of the other players, the indication preferably indicating one or more of: the game being paused, the disconnected player, and the time until the game is resumed.

The game is preferably a wagering game.

Preferably, the wagering game uses forced bets (e.g. blinds), the game server being configured to place forced bets without user involvement, the method comprising, when a forced bet is to be placed for a given player, testing the connection between the game server and the client device associated with the given player prior to placing the forced bet, and, if the client device is disconnected, pausing the game without placing the forced bet. The forced bet is then preferably placed if (and only if) the player reconnects, typically within the allowed time period. If the player does not reconnect, the game continues without the player, and without the player's forced bet having been submitted. In this way, the player does not lose a forced bet if he is unable to participate in the game, which could otherwise negatively affect the play experience.

Testing the connection preferably comprises sending a request to the client device, and determining that the device is connected if a response to the request is received from the device (i.e. a challenge-response test). Where multiple forced bets are involved, the connections for the relevant players may be tested at the same time (i.e. not waiting for a response from a first player device before sending a challenge to the second player device) so as to avoid unnecessary delay.

The invention also provides a computer program or computer program product comprising software code adapted, when executed on a data processing apparatus, to perform a method as set out above.

The invention also provides a system for operating an online multiplayer game, wherein a plurality of players participate in the game using mobile client devices connected to a game server over a mobile telecommunications network, the system comprising: a monitoring component (e.g. comprising a processor) for monitoring the state of the connection of each client device to the game server; a processing component (e.g. comprising a processor) arranged to pause the game in response to detecting the disconnection of a client device associated with a given player from the game server; the processing component further being arranged, in response to the disconnected client device reconnecting to the game server, to: connect the given player to the paused game; and resume the game with the given player. The system is preferably adapted to perform a method as set out above.

Over-Air-Configuration Aspects and Features

In a further aspect, the invention provides a method of configuring a game program provided in a first device connected to a communications network, comprising: accessing, in a second device connected to the communications network, configuration data relating to a corresponding game program provided in the second device; transmitting the configuration data to the first device; and configuring the game program in the first device in accordance with the configuration data.

In this way, a game program can be configured remotely and efficiently by copying the configuration over the network; one player can send their configuration to another player, removing the need for manual configuration by the other player.

The method may comprise initiating a game at the first device in accordance with the received configuration data in response to receipt of the configuration data, preferably automatically or under control of the user i.e. by way of a user prompt.

The game program is preferably adapted to participate in online games. The method preferably comprises connecting or joining the first device to a wagering game in which the second device is participating, preferably in response to receipt of the configuration data (automatically or via a user prompt). The game to which the device is to be connected may be specified in the configuration data. In this way, one user can initiate a game with another user and configure the other user's game program appropriately in a very simple and efficient manner, without the other user having to manually configure the game program, search for the relevant game and so on.

The network is preferably a mobile telecommunications network. The method preferably comprises transmitting the configuration data in the form of a message, preferably a short message service (SMS) message, or other standard mobile telecommunications messaging format (e.g. MMS). This can enable efficient configuration of mobile telephones and similar devices. The game program or a game session may be started in response to the message.

Configuring the game program may comprise modifying configuration data stored at the first device in accordance with the configuration data received from the second device. Alternatively or additionally, configuring the game program may comprise transmitting configuration data to the online gaming system (or a game server thereof). Thus, the configuration data for a user may be stored locally at the device or remotely at the gaming system (or both).

The game program is preferably a wagering game program. The configuration data preferably relates to one or more of: a game type or variant, a maximum number of players, a betting limit, a buy-in quantity, and the appearance of the game program.

The first and second devices are preferably connectable to a game server via the communications network to participate in online games. The method preferably comprises transmitting the configuration data directly from the second device to the first device over the network, bypassing the game server. Alternatively, the configuration data may be sent via the game server.

The devices are preferably mobile communications devices connected to the online gaming system via a mobile telecommunications network. Over-air configuration of the game program can simplify configuration of the game, in particular where the devices are mobile devices, since the limited screen space and user interface capabilities of such devices can make configuration cumbersome.

The configuration data may be transmitted in response to a predefined event, state or observable occurring at the second device (as set out above), preferably a game-related event. The predefined event may be the initiation of the game program at the device or the initiation of a game within the game program. In this way, for example, an invitation can be sent automatically by one player to another to join a game, the invitation including the relevant data for configuring the other player's device for the game.

The game programs may operate wagering games, the predefined event preferably comprising the submission of a wager by a user of the device.

The method preferably comprises transmitting the message to a predetermined recipient or to a predetermined group of recipients. The predetermined event, predetermined recipient and/or predetermined group of recipients are preferably defined in preference data stored for the user. Thus, the user may, for example, configure the device by setting preference data specifying that, whenever the user starts a given game, an invitation is to be sent automatically to a defined group of contacts to join the game.

The method may comprise, after configuring the first device, detecting a modification of the configuration data for the second device, and, in response to the modification, modifying the configuration data for the first device accordingly. In other words, the first device configuration may be kept synchronized with the second device configuration automatically. This again simplifies configuration for the user of the first device. This may be achieved by sending further configuration data or configuration messages.

In a further aspect, the invention provides a method of configuring a game program provided on a mobile device connected to a mobile communications network, the method comprising: inputting configuration data using a computer terminal connected to the Internet; and transmitting the configuration data to the mobile device over the mobile communications network. The method may comprise inputting the configuration data using a web page displayed at the computer terminal, the web page being provided by a web server connected to the computer terminal via the Internet, and transmitting the configuration data from the web server to the mobile device over the mobile telecommunications network. This can simplify configuration of a game provided on a mobile device, since a more complex and flexible configuration interface can be provided on a web page.

The invention also provides a method of configuring a game program in a device connectable via a communications network to an online gaming system (or a server thereof), the method comprising: analysing at the online gaming system game information relating to games in which a user of the device has participated to determine game preferences or playing habits of the user; and transmitting configuration data to the device over the communications network to thereby configure the game program in accordance with the outcome of the analysis, or alternatively or additionally modifying game configuration data stored at the online gaming system for the user or device. In this way, the user's game program can be configured automatically in a suitable manner based on the player's habits, which can improve the user experience.

The invention also provides a computer program or computer program product adapted, when executed on a data processing apparatus, to perform a method as set out above.

The invention also provides an online game system comprising first and second devices connectable to a communications network and adapted to run respective game programs; wherein the second device is arranged to access configuration data relating to the game program provided in the second device, and to transmit the configuration data to the first device; and wherein the first device is arranged to configure the game program in the first device in accordance with the (received) configuration data.

The invention also provides an online game system comprising a mobile device connectable to a mobile communications network and adapted to run a game program, the system comprising: an input component for inputting configuration data using a computer terminal connected to the Internet; and a transmission component adapted to transmit the configuration data to the mobile device over the mobile communications network.

The device of either aspect is preferably adapted to perform a method as set out above.

Shadow Gaming Aspects and Features

In a further aspect, the invention provides a method of configuring an online gaming system adapted to operate a game session for a first user of the gaming system, the operation of the game session being configurable by the first user using configuration data associated with the first user, the method comprising: configuring the game session for the first user in accordance with configuration data associated with a second user of the game system.

In this way, the user need not manually configure their game session; instead, the user can "shadow" another user's configuration. The configuration data preferably includes user preference data defining a preferred game type for a user. For example, the user may wish to play games of the same type as a celebrity who also uses the online gaming system. Accordingly, configuring the game session preferably comprises modifying the configuration data for the first user in dependence on the configuration data for the second user. Modifying the configuration data for the first user may comprise copying all or a defined subset of the configuration data for the second user.

The method preferably comprises receiving a request from the first user identifying the second user, and configuring the game session in response to the request. Thus, continuing the above example, the user may send a request to "shadow" another user, in response to which the user's configuration is modified accordingly.

The method may alternatively comprise receiving a message from the second user, and configuring the game session in response to the message. This may occur automatically, or in dependence on a user prompt. The message preferably comprises configuration data for the second user, the method comprising configuring the game session for the first user using the configuration data in the message. In this way, a user need not configure the game session manually but can instead have their game session configured remotely by another user, simplifying the configuration process.

The method preferably comprises detecting a modification of the configuration data for the second user, and, in response to the modification, modifying the configuration data for the first user. In this way, if a user is "shadowing" another user's game preferences, the user's preferences can be automatically updated as the other user's preferences change, without further interaction by the user.

A game application or program preferably operates the game session, and configuring the game session preferably comprises configuring the game application or program. The game application preferably comprises a client game application or program for execution on a client device associated with the user and a server game application or program for execution on a game server, the client game application or program being adapted to communicate with the server game application or program over a communications network, and wherein configuring the game application or program preferably comprises configuring one or both of the client game application or program and the server game application or program. Thus, configuration/user preference data may be stored locally at a user's client device, or remotely at a game server, and is updated accordingly.

In a further aspect, the invention provides an online gaming system for operating wagering games for participation by a plurality of users when connected to the system via a communications network, adapted to: receive an indication of a first user and a second user or receive an indication from a first user identifying a second user; record a wagering action performed by the second user when using the online gaming system; and perform a wagering action for the first user in dependence on the recorded wagering action of the second user.

In this way, a user can "shadow" wagering actions performed by another user (for example a celebrity). For example, the user may configure the online gaming system to place a bet in a roulette game whenever a celebrity does so, for example on the same number and/or with the same bet amount as the celebrity. Thus, the wagering action performed for the first user preferably corresponds at least partly/in some aspect to the wagering action performed by the second user.

The recorded action preferably relates to a given game type, in which case the system is preferably adapted to join the first user to a game of the given game type or initiate a game of the given type for the first user. The recorded action may comprise a wager submitted in respect of a given game event or outcome; the system being adapted to submit a wager for the first user in respect of the given game event or outcome. The recorded action is preferably associated with a wager amount, the system being adapted to initiate a wager having the same wager amount as the recorded event or a defined multiple or fraction thereof.

The online gaming system is preferably adapted to initiate the wagering action for the first user in response to a request from the first user. The user may, for example, be prompted to confirm whether they wish to shadow a given wagering action. The system may be adapted to initiate the wagering action for the first user in response to the first user connecting to the system. For example, when "shadowing" a celebrity, the system may perform a "shadow" gambling action corresponding to the last or a randomly selected action of the celebrity when the user connects to the system. The system may be adapted to initiate the wagering action for the first user in response to the performing of the action by the second user. In this way, the user could follow the other user's gambling actions "live", as they happen.

The invention also provides a method of operating wagering games for participation by a plurality of users when connected to the system via a communications network, the method comprising: receiving an indication from a first user identifying a second user; recording a wagering action performed by the second user when using the online gaming system; and performing a wagering action for the first user in dependence on the recorded wagering action of the second user. The invention also provides a computer program or computer program product comprising software code adapted, when executed on a data processing apparatus, to perform a method as set out above.

Multiple Games Aspects and Features

In a further aspect of the invention, there is provided a game program or game program product for use in a mobile device connectable to an online gaming system via a mobile telecommunications network (the online gaming system preferably being adapted to operate or provide access to games, e.g. wagering games), the game program comprising: means or code for communicating with the online gaming system to participate in a plurality of concurrent games; interface means or code for providing a game interface to a user of the program relating to a current one of the plurality of games; and switching means or code for switching the interface means to a different one of the plurality of games. In this way, a mobile device user may participate in multiple games (for example multiple wagering games) simultaneously in a simple and efficient manner.

The switching means is preferably adapted to switch to a different one of the plurality of games in response to a game event occurring in the current one of the plurality of games. The game event may, for example, comprise the end of or withdrawal by the user from the current one of the plurality of games, or the end of or withdrawal by the user from a round in said game (for example the switching means may switch from a poker game to another game when the player folds in the poker game). Where the current game is a turn-based game, the game event may comprise the end of the user's turn in the current game. In a further example, the game event may comprise the submission of a wager by the user in the current game. The switching means may switch to another game whenever a period of inactivity (for the player) arises in the current game. In this way, switching between games can be automated in an appropriate manner, simplifying the switching process and user interface, and increasing the amount of active play time for the user. The game program preferably further comprises selection means (e.g. a user interface) for selecting, by the user, one of the plurality of games to be displayed by the interface means.

The invention also provides a device comprising a game program or program product as set out above.

The invention also provides a method of operating a plurality of games in a mobile device connectable to an online gaming system via a mobile telecommunications network, the method comprising: communicating with the online gaming system to participate in a plurality of concurrent games; providing a game interface to a user of the device relating to a current one of the plurality of games; and switching the game interface to a different one of the plurality of concurrent games in response to a predefined event, preferably a game event or user input.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

Preferably, the various aspects and features described above are provided in the context of a mobile online gaming system, in which mobile devices under the control of players communicate with the gaming system, or with a game server of the gaming system, over a mobile telecommunications network, to participate in multiplayer and/or single-player wagering games.

However, the aspects and features described may also be applied in the context of games other than wagering games, and in the context of other types of online gaming systems. For example the aspects and features may be applied to an online gaming system provided over the Internet, for participation by users using personal computers connected to the Internet.

DETAILED DESCRIPTION OF PREFERRED EMBODIMENTS

Preferred features of the present invention will now be described, purely by way of example, with reference to the accompanying drawings, in which:—

OVERVIEW

The online gaming system of preferred embodiments of the invention provides the user with a number of features. The user is able to configure their gaming experience to meet their needs. Once the user has set their preferences the gaming system can use any observable, such as an incoming telephone call, to initiate a gambling event, or any other such event. This allows the user to drop in and out of the mobile gaming environment without the requirement of initiating an application manually (referred to herein as the observables feature). The online gaming system also allows for multiple concurrent games to be played, such as blackjack and poker. The switching mechanism between these games may be an observable, such as a win in poker.

In order to set the user preferences the user may in the first instance set them within the gaming system itself. However, the user is also provided with an online interface, that may be accessed using either a mobile device or an internet connected PC. This enables the user to configure their preferences using a more suitable interface than a small-screen mobile device (referred to herein as the over-the-air configuration feature). Using this system a user may also choose to use or copy other users' preferences; generally this will be the user's friends, but alternatively it could be any other user, including a "famous" person (referred to herein as the shadow gaming feature).

Furthermore, once the gaming system is initiated, in one embodiment, the present invention allows for users to lose connection to the network and remain within the game, at least for a short period of time, while they re-instate their connection; once reconnected the user will be placed back into the game in the same position as when they lost connection (referred to herein as the drop-out feature). The system also operates an allocation mechanism for allocating players to games (referred to herein as the brushing feature). These features will be described in detail below.

Figure 1:
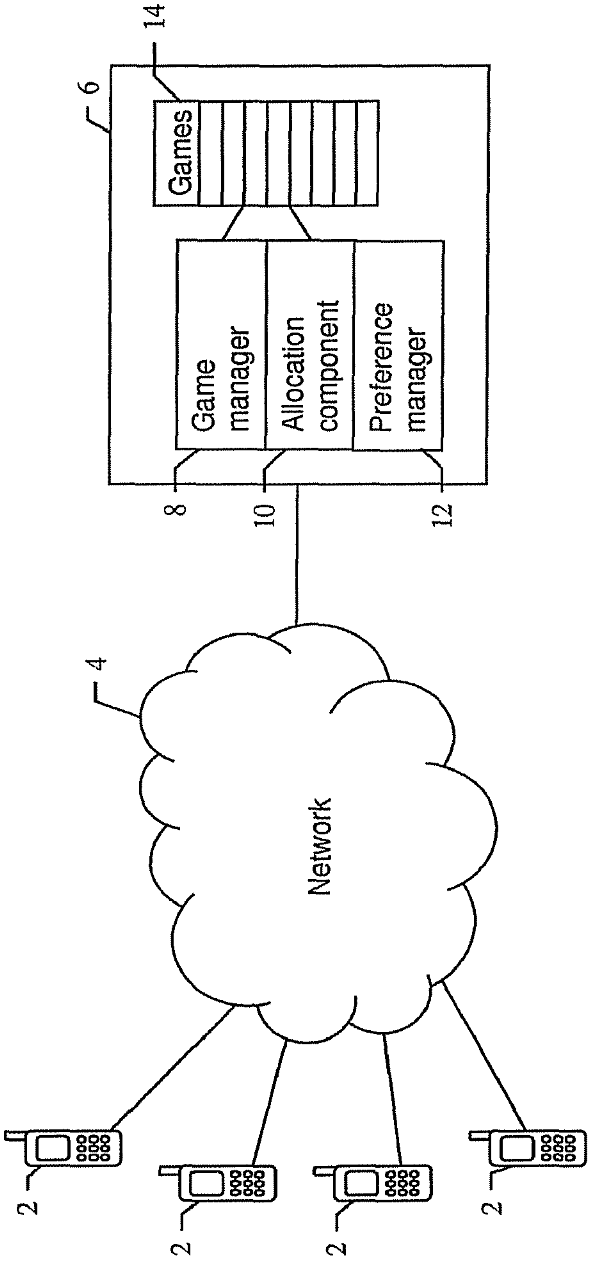
FIG. 1 illustrates a mobile gaming system in overview.

The online gaming system is shown in overview in FIG. 1.

The online gaming system comprises a gaming server 6 connected to a communications network 4. In the present example, the network includes a mobile telecommunications network. The network may additionally include other networks, for example the Internet. A plurality of mobile devices 2, for example mobile telephones, are also connected to the network 4, via which they are able to communicate with gaming server 6.

The gaming server 6 comprises various components including a game manager 8 for operating a plurality of concurrent multiplayer wagering games 14, a player allocation component 10 for allocating players to games, and a preference manager 12 for managing player preferences.

A given player can connect to the gaming system using a mobile device 2 and is allocated to one of the plurality of concurrent multiplayer games 14 by allocation component 10. Allocation occurs at least in part based on user preferences, which can be defined using the preference manager 12. Preference manager 12 may be configured using a mobile device or an internet connected PC. Once a player has joined a given game, the game manager 8 manages the progress of the game and communicates with mobile device 2 to transmit game state updates and receive user input relating, for example, to play actions and wagers.

Though shown as a single server, the game server 6 may alternatively be implemented as multiple connected servers, which may be in the same location or may be geographically remote. For example, individual games or groups of games may be operated on one or more remote servers, with the game manager managing access to the remote servers by the mobile devices and initiating participation in a game by a device, but not itself controlling operation of the games. In that case, once participation in a game by a device has been initiated, communication between the device and relevant server may be via the game server 6, or may be direct between the device and the server. However, for simplicity, it will be assumed here that game server 6 itself operates the games.

The server 6 also includes functionality (for example in the form of a connection management component, not shown) for managing connections to mobile devices, including setting up new connections and terminating connections. Allocation of a newly connected player to a game may be performed automatically as soon as a connection has been established. In this way, the player can connect to the system and start participating in a game in a single action, thus maximising play time and user convenience. Alternatively, a menu may be displayed, allowing the user to request to join a game as well as performing other operations, such as managing the player's preferences. Whether allocation occurs automatically on successful connection to the system, or is initiated via a menu displayed after a connection is established, may also be configurable, for example as part of the player's preferences.

Figure 2:
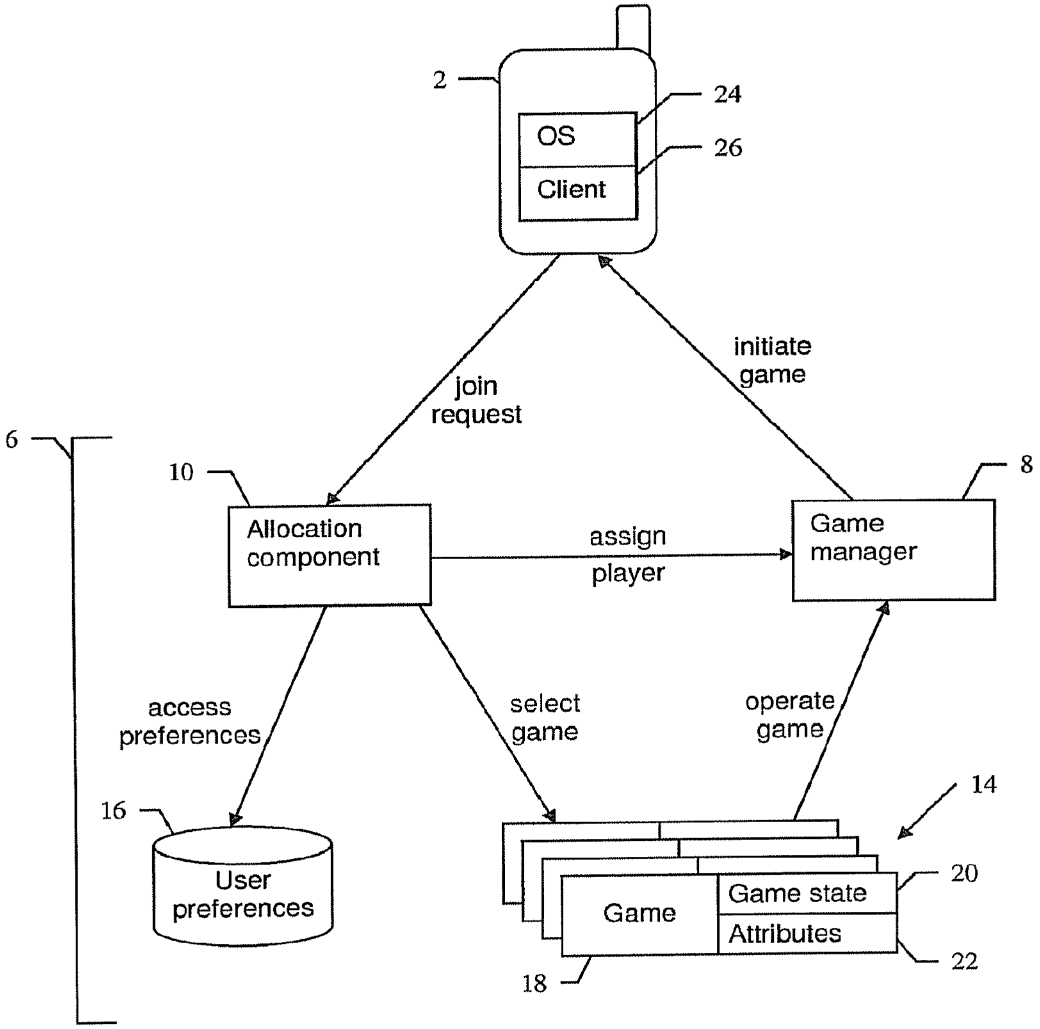
FIG. 2 illustrates the operation of a player allocation component of the gaming system.

The operation of the system, and in particular the allocation component 10, is illustrated in more detail in FIG. 2.

The mobile device 2 includes operating system software 24 which manages the basic functionality of the mobile device, including communication with the mobile network, and a client game application 26. The client game application may, for example, be downloaded by the player over the mobile communications network from the gaming server or some other source, or may be installed on the device in some other way.

The client application 26 is preferably a thin client, providing essentially display and user input functionality and communicating with the gaming server 6. The gaming server 6 manages the operation of the games and transmits display instructions to the client application 26, for example to provide menus and update the display with the current game state during game play. The client application receives user input typically via a mobile telephone keypad, and transmits the received input to the gaming server 6.

In particular, after starting the client application 26, a menu screen is displayed, which includes a menu option for joining a game. If the player selects this option, the client application transmits a request to the gaming server to join a game. The request is processed by allocation component 10, which accesses user preferences 16 to obtain the player's game preferences for the particular variety of game they have chosen. The preferences specify the type of game the player prefers to participate in. The allocation component then accesses the available games 14 to select an appropriate game based on the player's preferences.

Each game 18 comprises a current game state 20 and attributes 22. The game state 20 includes information such as the current number of players, the positions the players have been allocated to, and the current state of play. The attributes specify the type of the game, specifying, for example, where applicable, game types and variants, the maximum number of players for the game, and other game-related information such as buy-in and betting limits.

The allocation component 10 selects a game 18 having attributes matching the player's preferences, and which is not full. There will typically be several such games available, and the allocation component therefore in a second stage also evaluates the game state of any games matching the player preferences, in particular the number of players currently participating in each game and the player positions. The rules applied in selecting a game will be discussed in more detail below.

Once a suitable game has been selected, the allocation component 10 assigns the player to the selected game. The game manager 8 then initiates participation by the player in the game, by transmitting instructions to the client application to display the current game state and to start receiving input as appropriate.

If no suitable game matching the player's preferences is available, then a new game of that type is created and the player is allocated to the new game. Thus, the first player to log in to the service with a different set of preferences will be allocated to a new game, and subsequent players joining with similar preferences will automatically be joined to that game.

Instead of matching the player's preferences exactly, the allocation component could alternatively select a game of a type similar to the player's preferences where no exact match is available. Similarity could be determined based on one or more configurable rules (for example, to select a game with different betting limits). In that case, when setting user preferences, the players may also have the option of specifying which game attributes may be varied and which attributes must be exactly matched when a suitable game is selected for the player.

Once players have configured their preferences, they do not need to specify the type of game in which they wish to participate again unless their preferences change, and can quickly and easily join a game of the desired type relying on the automatic allocation mechanism when connecting to the system in the future. In this way, the player's playing time while connected to the system can be maximised.

Though the described system can be applied to any type of online game (including games provided over the Internet or other networks), the context of the present examples is that of wagering games, in particular Poker-type games, provided over a mobile telecommunications network.

More particularly, the operation of the system and the selection rules applied by the allocation component 10 will now be described in more detail in relation to the specific example of "Texas Hold'em" poker. To assist in the understanding of the described embodiments, the rules of "Texas Hold'em" will now be summarised briefly.

Texas Hold'em uses one deck of 52 cards. Aces are high and low. There are no jokers or wild cards. Tables consist of up to 10 players. Each player is assigned as dealer on a round-robin basis (dealing is of course automatic in the online game). The dealer position is usually represented by the "dealer button", which is represented graphically in the online game by an appropriate icon. The player to the left of the dealer posts small-blind and the player to his left posts big-blind (usually twice the small-blind). The blinds ensure that there is always money in the pot. Two cards are then dealt face down to each player (the hole or pocket cards). This is followed by a betting round, starting with the player to the left of the big-blind. Each player must fold, call or raise the bet. The bet in the first instance is the big-blind. Bets are limited to a set amount (usually equal to the big-blind amount). The betting round continues until all bets have been called or all but one player has folded.

Next comes the "flop". Three cards are dealt face-up in the middle of the table (the board or community cards). Another betting round ensues, starting with the player to the left of the dealer. His choice is to check or bet. As no bets have been placed (he his first to act and there are no blinds) he has the choice to check, which costs him nothing and lets him stay in the game. Once a bet has been made, there is no checking and all players must call or raise the bet. The betting round continues until all bets have been called, everybody checked or all but one player has folded.

Then comes the "turn". One more card is dealt face-up in the middle of the table. Another betting round ensues, starting with the player to the left of the dealer. At this point the betting limits go up, usually to double the big-blind amount. His choice again is to check or bet. The betting round continues until all bets have been called, everybody checked or all but one player has folded.

The final stage is known as the "river". One more card is dealt face-up in the middle of the table. Another betting round ensues, starting with the player to the left of the dealer. His choice again is to check or bet. The betting round continues until all bets have been called, everybody checked, or all but one player has folded.

If more than one player is left in, then a showdown commences. The player that was called must show his cards. The hand is made up of the best five cards from the players' two pocket cards and five community cards. Each remaining player must then either muck their cards (if they lost) or show them (usually if they won, but players may choose to show losing cards if they were particularly strong). The player with the best hand is declared the winner and gets the pot.

Position is a crucial factor in the game. The dealer is in late-position as he is last to act in all betting rounds. This means he gets to see how everyone else is betting before he makes his move. This is considered highly advantageous and the best position to be in. The big-blind is at a considerable disadvantage because he is committed to the pot no matter how good his hand is. There is therefore a scale of worst-to-best position from the big-blind to the dealer.

In the context of poker, the active games 14 are referred to as "tables", since each game represents a virtual poker table. Each table has a number of defined player positions, mirroring the seats at a real poker table. Play proceeds in the proper order according to the player positions, following the standard rules of the game. Each table has a maximum number of players (in the described embodiment, two-player and six-player tables are provided due to the limitations of mobile telephone screens). However, at any given time, not every player position need be taken by a participating player; instead, individual positions or seats can be empty. Play nevertheless proceeds with those players present, assuming there is more than one player at the table. New players are allocated to tables with available seats by the allocation component 10. Players can also choose to leave a table at any time. Again, play continues as long as at least two players remain.

Figure 3:
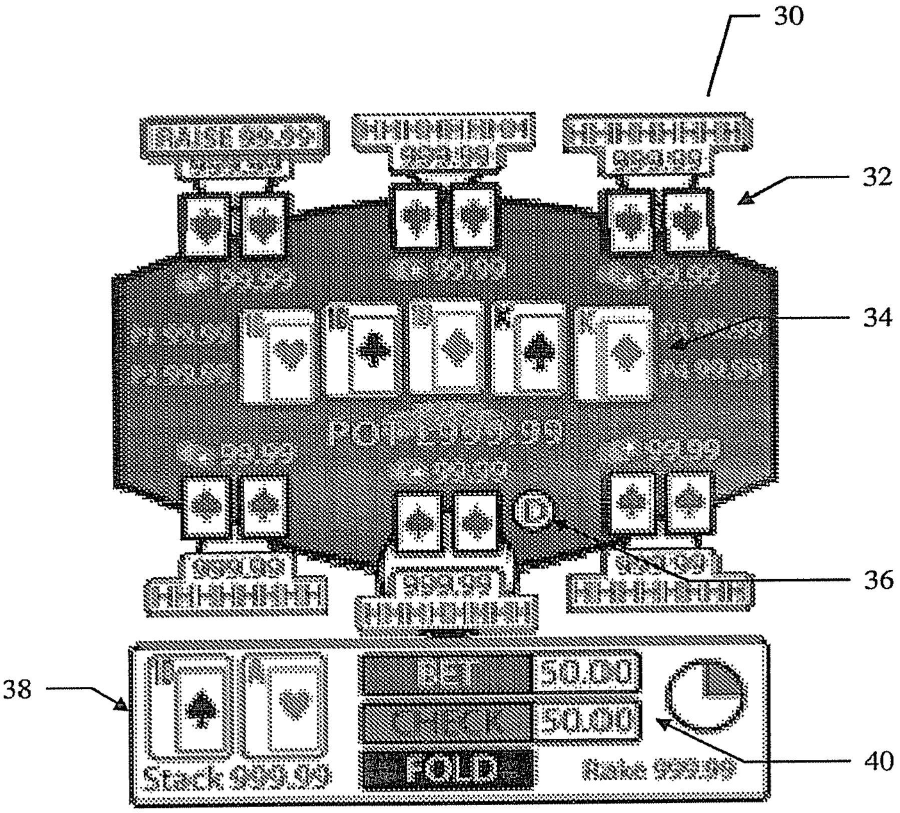
FIG. 3 is an example of a screen displayed on a mobile device during participation in a game.

When a player is participating in a game, the game state is represented graphically on screen of the player device 2, as shown in the example screen of FIG. 3. The example screen 30 shows details for each participating player 32 around a representation of a poker table, with the community cards 34 represented at the centre. A dealer button icon 36 highlights the current dealer position. The player's pocket cards and other details 38 are shown below the representation of the poker table, along with available actions 40 if it is the player's turn. Information such as the current size of the pot and the player's stacks is also displayed.

The operation of several of the features previously mentioned will now be described in more detail in turn. First, the operation of the allocation component 10 will be described in more detail. The allocation component 10 operates an allocation mechanism referred to herein as "the brush" (after the name sometimes given to an employee in a card room who is responsible for managing the seating list). The over-the-air-configuration feature will then be described in further detail with reference to FIG. 4, and the shadow gaming feature will also be described in that context. This will be followed by a detailed description of the observables feature, with reference to FIGS. 5 and 7. Finally, a more detailed description of certain aspects of the implementation of the gaming system will be provided.

The Brush

Instead of a traditional lobby interface, where the user is presented with menus and lists of games, the online gaming system of preferred embodiments of the invention employs an automatic allocation system (also referred to herein as the brush mechanism), using which players are automatically sat in available seats (brushed). In this way, much of user interface complexity of conventional systems can be avoided. The approach also fits well with the "in-and-out approach" of the mobile gaming environment, where players are expected to drop-in for a quick game and drop-out after a fairly short time period, say 20 minutes. The described approach also allows easier balancing of tables, and avoids the need for collusion detection, as it removes players' ability to choose which game to participate in.

The brush provides a way of seating players in optimal seating positions without a full lobby service.

Given limited player liquidity and the in-and-out nature of mobile poker, a full lobby with lists and lists of tables is both cumbersome to navigate and difficult to implement. Mobile communications latency means that the list of tables with open seats is likely to be out of date quite quickly, and would need to be refreshed constantly. The brush also means that the server controls on which table and in which seat the player is sat, an important factor in creating a good play experience at the tables.

Further, it is possible for two mobile players to physically stand next to each other. This invites collusion possibilities that are prevented by existing online poker rooms based on IP addresses. Colluding players may find each other in traditional lobby services by scanning the players at each table, or communicating with each other to agree the tables they are going to sit at.

Using the present brush mechanism, there is no list of tables and players cannot select to sit at any particular table. This avoids the need for a cumbersome lobby user interface, as well as the need for a collusion detection component. Furthermore, the aforementioned mobile communications latency and refresh problems can also be addressed.

The brush can also improve the poker experience for the player by simplifying access to the game and avoiding the complex lobby-style interfaces to which online poker players are accustomed. However, it should preferably still be possible for a serious player to select the type of game in which they wish to participate.

To achieve this, the preference management component 12 (see FIG. 1) allows the players to define their preferred game types, by providing selections for a set of available game options. Examples of such options may include:

Currencies: Play Money, British Pounds Sterling, Euros,

Categories: Ring Games, Sit & Go Tournaments, Multi-table Tournaments, . . .

Games: Texas Hold'em, Omaha Hi/Lo, Crazy Pineapple, 7 Card Stud, 5 Card Draw, Dealer Choice, . . .

Handedness: 2-Max (heads-up), 4-Max, 6-Max, 10-Max (full handed), . . .

Structures: Fixed Limit, Pot Limit, No Limit, . . .

Limits: £0.20/0.40, £0.50/1.00, £1.00/2.00, £2.00/4.00, £5.00/10.00, £5+1, £10+2, £20+2, . . .

Buy-In: £5=€7.20, £10=€14.50, £20=€29.00, £30=€43.57, £40=€58.09, £50=€72.62, . . .

The actual set of options will of course depend on the type of games being provided and on the service operator's requirements.

To enable the user to set their preferences quickly and easily, the preference management component 12 preferably provides a wizard-style interface which is displayed at the player device 2 and which takes the player through the available options. On completion of the wizard, the selected options are then transmitted from the mobile device to the preference management component 12 and stored in the user preference database 16.

Once the player has completed the wizard and asks to join a game it is the job of the brush to sit him at an appropriate table. Specifically, the allocation component selects a table in accordance with the configured preferences and joins the user to the selected game.

In some embodiments, upon logging into the system in the future, a user can be brushed immediately into his/her preferred game without the requirement of selecting the game manually, based on the preferences previously set using the preferences wizard. Should the user wish to play a different type of game, the user has the option of leaving the automatically selected game and accessing the preference wizard to modify the stored preferences, before again invoking the allocation component by requesting to join a new game.

As illustrated in FIG. 2, each active game (or table) 18 comprises a set of attributes 22. These correspond to the user preference options which can be selected in the preference wizard, and define the type of a given game. The allocation component 10 selects a game for the player by matching the game attributes to the user preferences.

There will usually be several tables of a given type (i.e. matching a given set of preferences) running, with varying numbers of players currently at each one. In addition to selecting a table matching the player's preferences, the allocation component 10 therefore also seeks to balance the tables, by selecting the most appropriate table as well as selecting an appropriate seat for the player at the selected table. More specifically, from the tables which match the player's preferences (and which are neither completely empty nor full), the allocation component selects an appropriate table based on a defined set of rules, as will now be described in detail. The selection process will be described in relation to six-player tables. However, the process can be adapted for any number of players.

For a six-player game, the optimal number of players at a table has been found to be 4 or more. This allows for players to drop-out without disturbing the game greatly. Obviously if there were only two players (heads-up) then the game would be over if either of them left, and dropping from 4 to 3 players has many ramifications for the other positions and makes it rather difficult to seat new players. When deciding at which table to sit the new player, the following priorities are therefore observed, in the given order:

1. Join a 2-player table, not between the blinds
2. Join a 2-player table, between the blinds
3. Join a 3-player table, not between the blinds
4. Join a 3-player table, between the blinds
5. Join a 1-player table
6. Join a 4-player table
7. Join a 5-player table
8. Join a 0-player table (i.e. start a new table)

Therefore the brush will prioritise 2-player tables as these are seen as close to inactive. 3-Player tables come next, even where it means that the new player will have to sit out a couple of hands because they will be seated between the blinds. Keeping tables at optimal numbers of 4 or more players therefore takes precedence over propping up orphaned tables and creating new tables.

This has the effect of continually building tables of 4 or more players, which is a good number of players in case anybody drops out, while not filling the table to capacity and leaving no available seats.

The selection of appropriate tables and seats at a given table is guided by the available player positions (or seats) and the current state of play in a given game, since the player position can confer an advantage or disadvantage on a player as mentioned above. In the game of "Texas Hold'em" it is usually not possible to sit between the dealer-button and the big-blind. These seats are referred to collectively as "between the blinds". Online players can sit between the blinds, but they will not be dealt in until the dealer-button passes (they are "sat out"). Alternatively, the option may be provided for the player to post a penalty-blind in order to be dealt-in, instead of waiting for the big-blind to come around.

The brush mechanism therefore attempts not to sit players between the blinds. Instead, it attempts to sit new players in the optimal seat to the left of the current big-blind. This would then lead to a natural blind and would not penalise either the new player or the existing players. In practice however, this is rarely practicable. The following describes possible scenarios in the cases of empty, 1-player, 2-player (heads-up) and 3-player tables.

Joining an Empty Table

The brush will always attempt to join players to existing active tables with play in progress. However, where all existing tables are full, there is a need to join a player to an empty table (in other words creating a new table). The new player will be seated in the first position. If after some time another player comes along, they will be seated to the left of the existing player as in the one-player table example below. If, after some greater time no other players join the table, a prop (human player acting for the game service provider) or a bot (computer-controlled player) may be seated to-the-left-of the existing player.

Joining a 1-Player Table

A single player sitting at a table means that there is no game in-progress. Another player joining is quite natural, and leads to a normal heads-up game (where the blinds are reversed). The new player is seated to-the-left-of the dealer-button, with no seats in-between, as illustrated below:

| Seat 1 | Seat 2 | Situation |
|---|---|---|
| Button | Empty | New 2nd player joins |
| Button + Small | Big | Normal heads-up game, blinds reversed |

Joining a 2-Player Table

In heads-up (2-player) play, the blinds are reversed, so the dealer is always small-blind. When there are 2-players at a 6-max table there are 4 open seats, but not necessarily to-the-left-of the big-blind. Where possible, the new player will be seated to-the-left-of the current big-blind. This is quite natural and leads to the transition from a heads-up game to a multiplayer game. The solution presented here means that the player on the dealer-button has the advantage of getting it a second time. This is done to avoid any player having to pay big-blind more than once and completely avoids the need for a penalty-blind.

| Seat 1 | Seat 2 | Seat 3 | Situation |
|---|---|---|---|
| Button + Small | Big | Empty | New 3rd player |
| Button | Small | Big | Double dealer |
| Big | Button | Small | Normal |

It is necessary to sit the new player between the blinds when these are the only positions available. The actual seat is irrelevant, as the player will have to wait for one more hand in all cases. Once the next hand has passed, the above case kicks in as usual in the transition from a heads-up game to a multiplayer game. The brush will allow this to happen, as it is important to keep up the number of players at each table. The brush will not prioritise other tables, as 2-player tables would quickly die if this were the case.

| Seat 1 | Seat 2 | Seat 3 | Situation |
|---|---|---|---|
| Big | Button + Small | Empty | New 3rd player |
| Button + Small | Big | Out | New player out |
| Button | Small | Big | Double dealer |
| Big | Button | Small | Normal |

Joining a 3-Player Table

Where there are 3-players at a 6-max table there are 3 open seats, but not necessarily to-the-left-of the big-blind. Where possible, the new player will be seated to-the-left-of the current big-blind. This will lead naturally to a big-blind on the next hand.

| Seat 1 | Seat 2 | Seat 3 | Seat 4 | Situation |
|---|---|---|---|---|
| Button | Small | Big | Empty | New 4th player |
| Player | Button | Small | Big | Normal |

Sometimes it is necessary to sit the new player between the blinds. The player will have to wait for the dealer-button to pass before he can be dealt in, which can take one or two hands. The brush will try not to do this by prioritising tables where this is not necessary. However, where no other tables are available this can happen, in which case a penalty blind could optionally be required.

| Seat 1 | Seat 2 | Seat 3 | Seat 4 | Situation |
|---|---|---|---|---|
| Button | Small | Empty | Big | New 4th player |
| Big | Button | Out | Small | Out |
| Small | Big | In | Button | New player dealt in |
| Button | Small | Big | Player | Normal |

In addition to the allocation rules set out above (based in particular on player numbers and positions), other characteristics of games may be taken into account by the brush mechanism when selecting one of a number of tables identified as matching the player's preferences. For example, the mechanism may make a selection based on length of play at the tables. In particular the brush mechanism may select tables which are more stable, i.e. where players have played for longer, in preference to less stable ones. This may, for example, be achieved by calculating the average play time of the players at a given table and selecting tables where the average play time is highest. Alternatively, the drop-out rate could be calculated. In this way, the development of stable games can be promoted.

Leaving a Table & Position Juggling

The brush mechanism may optionally provide additional functionality to manage games appropriately when players leave tables (this functionality could alternatively be provided as part of the game manager 8).

In particular, when the players on the dealer-button or either of the blinds leave the table it affects the next dealer position and both the blind positions. There are some principles that govern the movement of the button and the blinds. The brush mechanism preferably adopts the following principles, which are adhered to in this order:

1. No player should ever miss a big-blind. The big-blind is a considerable disadvantage and other principles should not undermine this.
2. The player on the dealer button is at a considerable advantage. Players should not be on the button more than once, unless it is to preserve the order of the big-blind.
3. It is not possible to sit between the big-blind and the dealer button.
4. In heads-up the blinds are reversed, so the dealer is also on small-blind. The dealer is at an advantage in playing second, and so should not also be the big-blind and heavily committed to the pot. The small-blind would need a very good hand to justify entering the pot on every hand, if this were not the case.
5. The small-blind is fairly irrelevant, given the above principles, and generally the first thing to go when juggling the button and blind positions.

In the real-life game, it is usually not possible to leave a table until a full round of 10 hands has been played-out (in a full handed game). Typically, there will either be a penalty in a ring-game, or a forfeiture of chips in a tournament; so these situations do not arise.

However, in an online or mobile game it is understood that players may leave the table in-between hands. The application of the above principles to an online game leads to strange movements of the button and blinds (position juggling). There is no perfect solution, but not to apply them leads to complications in later hands that can make the game unfair, at best, and could break the game and crash the server, at worst.

The three positions that affect the game when they leave are the small-blind, big-blind and dealer-button. Each has a different effect depending on whether the game is 3-players or more than 3. In heads-up this is not important as the game is effectively over if a player leaves.

The solution introduces the concept of a dead dealer-button. This simply means that the dealer-button is put on an empty seat to indicate that it is dead. As the dealer is a virtual one, it has no meaning other than to signify the betting order.

In the following examples, leaving refers to the current player leaving, not the player that would receive the position in the next hand.

If the big-blind leaves with more than 3-Players, then the small-blind is skipped once and a dead-button is needed once:

| Seat 1 | Seat 2 | Seat 3 | Seat 4 | Situation |
|---|---|---|---|---|
| Button | Small | Big | Player | Big leaves |
| Player | Button | Empty | Big | No small |
| Big | Player | Dead Button | Small | Dead button |
| Small | Big | Empty | Button | Normal |

If the dealer leaves with more than 3-Players, then no action is necessary:

| Seat 1 | Seat 2 | Seat 3 | Seat 4 | Situation |
|---|---|---|---|---|
| Button | Small | Big | Player | Dealer leaves |
| Empty | Button | Small | Big | Normal |

If the small-blind leaves with more than 3-Players, then a dead-button is needed once:

| Seat 1 | Seat 2 | Seat 3 | Seat 4 | Situation |
|---|---|---|---|---|
| Button | Small | Big | Player | Small leaves |
| Player | Dead Button | Small | Big | Dead button |
| Big | Empty | Button | Small | Normal |

If the big-blind leaves with 3-Players, then a player is put on small-blind twice, but this is preferable to big-blind having the dealer-button:

| Seat 1 | Seat 2 | Seat 3 | Situation |
|---|---|---|---|
| Button | Small | Big | Big leaves |
| Big | Small + Button | Empty | Repeat small |

If the dealer leaves with 3-Players, then a relatively complicated situation arises. In order not to put a player on big-blind twice, instead the dealer is put on the big-blind. This satisfies principle (1) but breaks principle (2). Note that the blinds are reversed in heads-up play, so the dealer will also be the small-blind during normal play:

| Seat 1 | Seat 2 | Seat 3 | Situation |
|---|---|---|---|
| Button | Small | Big | Dealer leaves |
| Empty | Big + Button | Small | Big gets Button |
| Empty | Small + Button | Big | Normal |

If the small-blind leaves with 3-Players, then play continues in normal heads-up mode, since in heads-up play, the blinds are reversed anyway:

| Seat 1 | Seat 2 | Seat 3 | Situation |
|---|---|---|---|
| Button | Small | Big | Small leaves |
| Big | Empty | Small + Button | Normal |

The above examples describe the rules that are applied when a player leaves a table. Additionally, the brush mechanism may provide further functionality to dissolve tables with too few players (in particular those with only a single, "orphaned" player) and redistribute the players from the dissolved table to other tables. This is referred to as a "sweep". Preferably, the system uses a configurable threshold specifying the minimum number of players needed for a table to remain active; tables below the threshold are dissolved. Different thresholds may be provided for tables of different sizes (for example, for six-player tables the threshold may be two, while for ten-player tables, a threshold of four could be used). The service provider may modify the thresholds at any time, for example to adjust the behaviour of the system during busier or less busy times.

Players who are removed from tables in this way are reallocated to other tables based on their defined preferences, and using the standard allocation rules, as already described above. The brushing mechanism could also apply additional rules in selecting an appropriate table. For example, the brushing mechanism could attempt to identify games with a similar style of play so as to maintain the player's game experience. Similarity could be determined based on characteristics such as the speed of play at a given table, the total volume of "chips" (i.e. real or play money) at the table; or the average percentage of players at a table to see the flop (which indicates whether the style of play at the table is high- or low-risk). Such characteristics may be determined by analysis of the game history (using logs of past play events). Alternatively, the game manager 8 may continuously maintain statistics and other relevant data as play progresses as part of the game state data 20, allowing the allocation component simply to access the relevant pre-calculated characteristics in order to make a comparison.

The above characteristics could also be provided as additional user preference options. Thus, the user could define a preferred play style (e.g. high-risk/low risk) in the preference wizard, and the allocation component, in addition to comparing player preferences to game attributes as already described, would then also analyse play style at the tables to identify the most appropriate table for the player. The analysis may again be based on statistics maintained by the game manager 8 whilst running the games.

When reallocating a player from a dissolved table, the brush mechanism may also select tables based on length of play at the tables—i.e. selecting tables which are more stable—as already described above. In this way, the mechanism can avoid reallocating a player to a table which is itself likely to collapse shortly, thereby avoiding further disruption to the player.

Instead of just dissolving tables with low player numbers, the mechanism may alternatively also dissolve fuller tables (even completely full tables) and redistribute their players to several smaller tables so as to balance player numbers. This approach may be used, for example, when operating tournaments (a tournament typically begins with a set of starting players distributed across a number of tables, which are slowly reduced to a single table as players are eliminated).

In alternative embodiments, the sweep of orphaned players can be omitted, instead leaving it to the players themselves to leave a table and rejoin a new game using the normal brush mechanism.

To alleviate the problem of players dropping out of tables, a system of penalty blinds could optionally be provided. Generally speaking, the mobile gaming service is intended allow a player to participate for only a short time. In the online world, players sitting at a table often either have to wait for the big-blind to come around, which may take 10 hands, or elect to pay a penalty-blind equal to the big-blind. This is to ensure that all players contribute an equal number of blinds. Not to cover this situation means that players can sit down, see a few hands for free and leave before contributing a penny (if the cards they are dealt are not to their liking). This is in direct contrast to the principles of Texas Hold'em, where the forced blinds create the action and make the game exciting.

To this end, players who sit down and are dealt in are forced to pay a penalty-blind upon exiting, if they do so before the big-blind comes around. In this way players do not need to wait before being dealt in or suffer a penalty if they are not going to play for long, which is expected in the mobile game. On a 6-max table this means players will be dealt in on the next hand after they sit down, and will be expected to play at least 6 hands before leaving. The penalty does not kick in if they have paid big-blind once and then elected to leave, as this is up to the player if he does not wish to see free hands after the big-blind.

The allocation process used by allocation component 10 to allocate players to tables can be applied not just when a player who is not currently participating in a game specifically requests to join a game, but also in other situations. One example, already mentioned above, is when a table is dissolved, and the players from that table are reallocated to other tables. This can occur in order to balance tables to improve efficiency and game play experience and can also occur during tournaments or other structured gaming events where players are moved between tables by the system. Depending on the type of game, reallocation of players may also be carried out, for example, if an existing game comes to an end in accordance with the rules of the game (though this would typically not apply in poker where the only end condition is the elimination of all but one of the players), or if a game is terminated due to a technical problem or the player loses his connection to a game. More generally, the described methods may be applied in any situation where a player is to be assigned to a game or moved from one game to another.

Further features relating to player allocation which may be implemented as part of the allocation component will now be described. These may be implemented as extensions to the methods described above, or may be implemented independently thereof, using any other suitable allocation methods.

Preferably, the allocation component supports a dynamic brushing feature, whereby the user can set his/her preferences not only to include the types of games that he/she prefers to play, but also the people (his/her friends) that he/she wants to play with. When enough of the user's friends are available to play a specific type of game the game will automatically be set up and the players brushed onto that table, if appropriate removing the player from a game they are currently playing. The allocation component is preferably configured only to remove a player from a current game at the end of a round in that game or at an otherwise appropriate point; additionally, the allocation component may be configured to remove the player only from certain types of game (for example from single player games but not multiplayer games).

For example, if player A likes to play Texas Hold'em with players B, C, and D player A would set his/her preferences as such. Player A could then be playing Roulette and be alerted, and subsequently taken to the table, when players B, C, and D are available to play Texas Hold'em. In this way players can be brushed to their preferred games without the need for them to search manually for their friends.

In addition, players can be reallocated between tables based on detection of predetermined states or events, referred to herein as observables. The performance of game actions in response to such observables will be described in more detail later.

There will not necessarily always be a game available matching a given user's game preferences, e.g. when there are not enough players logged on for a certain type of game. Preferably, the user can create a hierarchy of different games (as part of their preferences) which the system will brush the player into as and when they become available; the system always attempts to place the player in the most preferable game available. For example the user could be brushed to a slots machine while waiting for a poker tournament to start. If the user has been allocated to a less preferred game, and a more preferred game becomes available (in accordance with the user's ordered preferences), the system may prompt the user or automatically move the player to the more preferred game, or may simply alert the user that a better game is available.

In a specific example of this, the brushing system can be used to keep players occupied whilst waiting, for example, for a tournament to start, and then taking them to the tournament at the appropriate time. For example, "Sit-and-Go" tournaments (SNG) are where players sit down at a table and wait for others to join (these are often single table tournaments). The rules are preset and related to the table in question. Once the required number of players have sat down at the table, the tournament begins immediately. Typically, this could be a 100+10 tournament, where each player puts $100 on the table plus also gives the house $10 as a tip (or fee) for playing. The resulting pot (the number of players times $100) is then won by the winner. Sometimes the runner-up may also get a prize. The benefit is that the player knows precisely how much many the player has put at risk ($110) and how much can be won (say $1,000 for 10 players).

For mobile phone gaming systems, Sit-and-Go tournaments can be difficult to provide because there is nothing for the player to do while waiting for the tournament to start. It would therefore be beneficial if the idle waiting time could be reduced as much as possible. This can be achieved by allowing players to drift off and then automatically get brushed to the right table when the time is right.

In certain embodiments, observables can drive gaming setup (this is described in more detail below). Preferably, a new sit-and-go tournament is started by the system with an ideal size (say 6 seats). If insufficient players register for the tournament, the size can then be reduced as a function of time to a lower number of seats to accommodate a reasonable starting time during less busy periods (this can be provided as an independent aspect of the invention). If it takes 15 minutes to fill two seats, then it may make sense to automatically reduce the table size to 4 seats to enable it to be filled in (perhaps) 30 minutes time.

A player may start a multi-player poker application and have preset preferences such as participating in a sit-and-go tournament. The player is then automatically brushed to that initial table. Given that the player probably is not the last player to join that table, the player can be brushed also to a 2nd choice (this can be cascaded), such as another sit-and-go tournament or a game of Blackjack.

When the initial table can be filled (and the tournament started) due to changes such as the availability of players or changes in the table setup (or other observables), then the player is brushed to the initial table.

The system may modify the allocation strategy for a player in response to how the player uses the game system. For example, the system may observe the number of times a user has played certain types of game and automatically adjust the brushing preferences in response—e.g. if a user starts playing a certain game type more than others, the system may in future automatically take the player to a game of that type. Alternatively, if the user starts to play a game less often the system may—prompt the user to start playing again, but in a different game. More generally, a user's playing habits may be considered "observables" and used to trigger game actions or configuration actions as described in more detail later.

The system is preferably enabled to receive requests from users to place them in games dependent on the amount of time they have available to play; for example, if the user only has 10 minutes then the allocation component would suggest a heads-up poker tournament, and if the user has 2 hours then the allocation component would suggest a multi-player poker tournament.

Instead of taking the player directly to the allocated game, the system may indicate to the player details of the game that has been selected and give the player the option of accepting or rejecting the allocation. If the user rejects the allocation, the allocation component may select an alternative game, or the user may be invited to modify their game preferences if no alternative is available.

As already mentioned, information about a player's playing style may also be used by the allocation component when allocating a player to a table (for example, allocation may occur based on a player's playing speed). In a further example, the system may additionally provide functionality for managing the orderly shut-down of games. For example, when a player is registered for a tournament starting at a future time, he may continue to play one or more other games while waiting for the tournament to start. Close to the starting time, the system may shut down any existing games for the player (and for other players playing in the tournament) in an orderly fashion. This involves, for example, waiting for a current round or hand to end, so as to avoid disruption.

The system may analyse the average time a given player takes to play a hand and use this information to determine how many hands a user can play before being taken to the tournament automatically. This check may be carried out automatically a certain time (e.g. 5 minutes) before the scheduled start of the tournament. Thus, a first player may be allowed to play four more hands of poker, while a second, slower player may only be allowed to play two more hands (or analogously, a certain number of spins of the wheel in roulette). After those hands have been played, the players are then automatically taken to the tournament (either to a tournament overview screen or directly to their allocated tournament table). In this way it can be ensured that all players are ready to start the tournament at the right time.

This shut-down and tournament set-up functionality may be provided as part of the allocation component and/or other system components. In preferred embodiments, the allocation component generally controls all player allocations to and movements between games, and, where appropriate, termination of games.

Typically, in many of the above examples, a player who is to be allocated to a game will have previously registered with the online gaming system, and the allocation component can make use of e.g. user preferences, information about past play style and the like when selecting a game for the player. The registration process itself can be lengthy and boring, as it requires the user to input various data such as name, address, credit card details, and the like. When using the limited user interface of a mobile phone, this process can be particularly cumbersome. In certain embodiments, to make the registration process more interesting and involving for the user, the system preferably allocates a new player to a game prior to the completion of registration, and displays the chosen game in the background while taking the user through the registration process.

Specifically, in the example of a poker game, when the user starts the application for the first time and/or requests registration, a table is selected by the allocation component and a seat at the table is allocated to the new player. The table selected preferably has a game in progress.

The registration process is then carried out with the registration interface superimposed on the display of the game in progress (e.g. using distinct colours, transparency effects or any other suitable technique), or with the registration interface displayed alongside the game in a separate region of the screen. For example, with a small screen, the registration process may consist of a sequence of queries displayed to the user, in response to which the user inputs various required pieces of information. On a larger screen, multiple inputs may be included on a single screen. The queries and entry fields may be shown superimposed at the centre of the screen. The registration process may commence with a text query asking whether the user would like to register now or would like to obtain more information (or perform some other available action).

In this way, the user is able to watch the game in progress whilst completing the registration process, which can help to maintain the user's interest. It can also give the user an overview of how the game works. Once the registration is complete, the user immediately becomes an active player in the displayed game.

To prevent the seat being taken by another user during registration, the allocation component preferably selects a game and allocates a seat in that game to the player at the start of the registration process and marks the game and seat as reserved. The selected seat may be marked or highlighted on the screen. However, the player does not become active (he in effect "sits out") until registration is complete, thus allowing the game to continue unimpeded during registration.

Player allocation may be performed using any of the methods described above (except that information on player preferences and play style will typically not be available for new players), or any other suitable methods.

Drop-Out feature

In preferred embodiments the online gaming system is adapted to enable user devices to lose connection with the gaming server while maintaining the user's session, at least for a limited period of time. This enables the user to reinstate their connection and rejoin the game.

The mobile application provides a limited period of time for players to respond to requests for action, for example to fold, call or bet while playing poker, before being "timed-out". This is required to provide the other players at the multiplayer table with an acceptable play speed. If the player fails to respond prior to being "timed-out", generally around 25-40 seconds, and he/she has not lost connection, then he/she will be actively removed from any further participation in the game until he/she has requested to be reinstated into the game (the player is "sat out")—this may incur penalties, such as a big blind bet if playing poker. However, if the player is "timed-out" of the game due to a loss of connection, for whatever reason (though typically this will be due to an involuntary disconnection), then an added period of time will be provided to that player in order for them to reconnect to the server. To this end, the server preferably monitors the state of the connection of each player, and if detecting a loss of connection by a player, pauses the game for an additional time period, during which the player can reconnect to the game. The remaining players at the table will be informed of the loss of connection, by displaying an indication to the other players, preferably indicating that the game is paused, the disconnected player, and the time until the game is resumed.

The player could lose connection for a number of reasons (voluntary or involuntary), for example he/she loses signal to his/her phone, or he/she receives a phone call. The system has the ability to cope with a large number of failure reasons, including battery failure in the mobile device, and more importantly, server failure. The example of server failure will be described further below.

Therefore, the player is provided with a suitably long period of time to re-establish his/her connection and re-initiate the application. To enable the player to rejoin the table as efficiently as possible, the table, environment etc, that the player was in prior to losing connection will be automatically reinstated. Provided that the player has reconnected within the added period of time he/she will rejoin the game in the same situation in which he/she left, for example while playing poker he/she will be in the same hand with the same bets. If the player does not reconnect in time he/she will be removed from the table and the game will resume without him/her.

The feature of allowing a player to rejoin a game in the same condition as when he/she lost connection is also available to single player games, such as blackjack. Therefore, this feature is available even though these types of games do not necessarily have a limited period of time to act. In this case, upon loss of connection the details of the game are saved. The details, are specifically the game state, and include, for the example of blackjack, the players cards, the dealer cards, the bet amount, and the state of the rest of the deck of cards, among other variables. This would enable the player, at any time after the loss of connection, to resume the game in the same state as when he/she lost connection.

In the mobile game it is important to provide an efficient speed of game play, mobile play tending to be slower than normal online play. To achieve this, in the example of poker-type games, all of the blinds are posted automatically, and, unlike other online poker games, a separate mechanism for players leaving the table is provided. This means that the game is not held up waiting for players to post blinds, and dealing commences immediately. However, it is necessary to deal with users becoming disconnected while blinds are posted. Therefore, the server sends out the normal "Action Requests" to post blinds. The client (gaming application) should respond automatically and immediately with a positive "Action Response"; if this is not received, then the blind is not posted, and the game is paused for a time to await reconnection as described above. In this manner, if a user has become disconnected, the player does not automatically post a blind, and the player is left out of the game; the server does not commence the deal and game-play with a disconnected player. The client may silently reconnect and post the blind, for example if there is a brief disconnection the client is able to reinstate the connection, alternatively the player may login again and the blind will be posted, automatically, putting the player in the game, albeit with a long delay.

The small and big blinds are requested simultaneously by the server in order to decrease the time taken to post blinds. However, if a user is seriously disconnected as described above, then the blind is rejected by the server on the player's behalf. This means that another request to post a blind is sent to the player in the next position. There are many scenarios in which this may result in dead positions or complex position balancing; these have been described previously with reference to "the brush".

In the event that the player does not reconnect to the table in the given time that player is deemed to be all-in to protect the player's monetary position. Such all-ins do, however, introduce an unfair advantage to the player, who can in effect stay in a pot in which the odds are not good enough to warrant a call or a bet. Therefore all-ins due to a disconnection (called disconnection protection) are capped at 2 per game. In this case the server will automatically place the player all-in for whatever bet he has on the table.

The game continues in a side pot if there are more players left to act. If there is more than one other player in the pot with the disconnected player then betting continues as normal; the side pot being contested by all of the players, the main pot being contested by the remaining, still connected, players. In the case that there is only one player in the pot capable of making a bet the game goes immediately to showdown; bets are dragged and any remaining community cards are dealt and the showdown commences.

Figure 7:
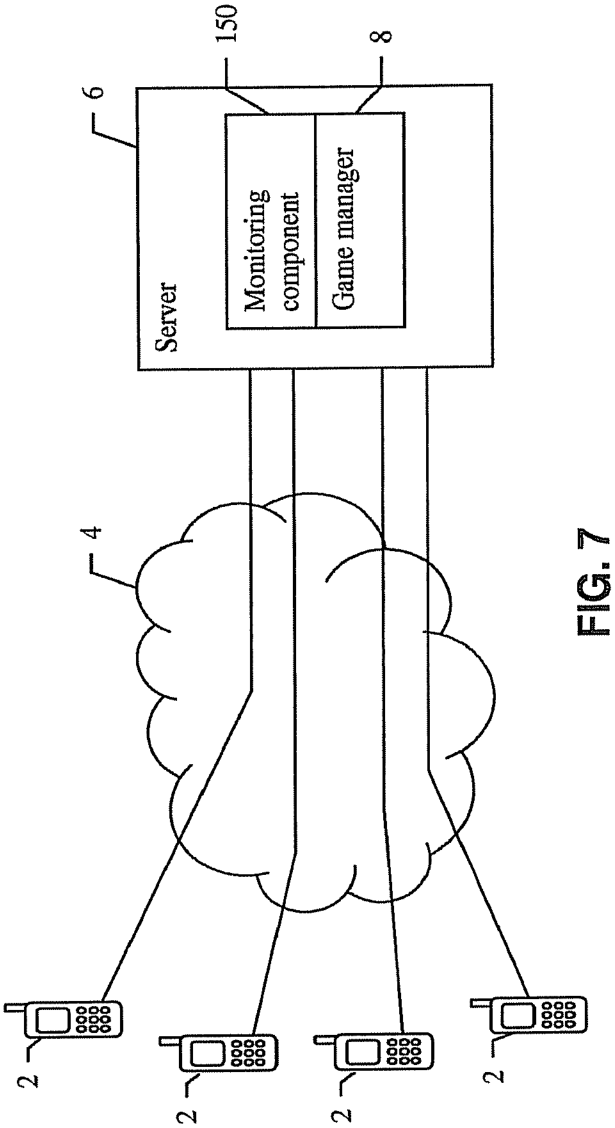
FIG. 7 illustrates a disconnection protection feature.

The drop-out feature is summarised in FIG. 7.

As shown, the server 6 comprises a processing component in the form of game manager 8 for running a game in which a plurality of user devices 2 are participating. Server 6 additionally comprises a monitoring component 150 for monitoring the state of the connection of each client device 2 to the game server 6. The monitoring component 150 informs game manager 8 when a connection is lost.

Game manager 8 is arranged to pause the game in response to detecting the disconnection of a client device associated with a given player from the game server. The game manager is further arranged, in response to the disconnected client device reconnecting to the game server within a certain permitted time, to connect the given player to the paused game; and to resume the game with the given player.

Over-the-Air Configurable Gambling

In preferred embodiments the system may be configured to allow the user to input their preferences remotely. This may be accomplished using either a mobile device, or preferably an internet connected PC. The user is provided with an internet web page adapted to receive their preferences. This provides the user with the ability to quickly and efficiently set-up their online gaming system preferences without necessarily using small-screen mobile devices. The preferences are then downloaded from the website in order to implement them in the mobile gaming system.

In the specific embodiment concerned with wagering games a user is enabled to set preferred wagering parameters from a web site, and download their preferences by clicking a button on the website. In addition to setting preferences such as game type, betting preferences, and observable preferences (see more detailed description below), the user can utilise their already known contacts, as found in their mobile device for example, to set preferences in relation to specific contacts (friends, etc). In this case the preferences would be such that the user can define who they prefer to play particular games with and other such multiple user type preferences.

Figure 4:
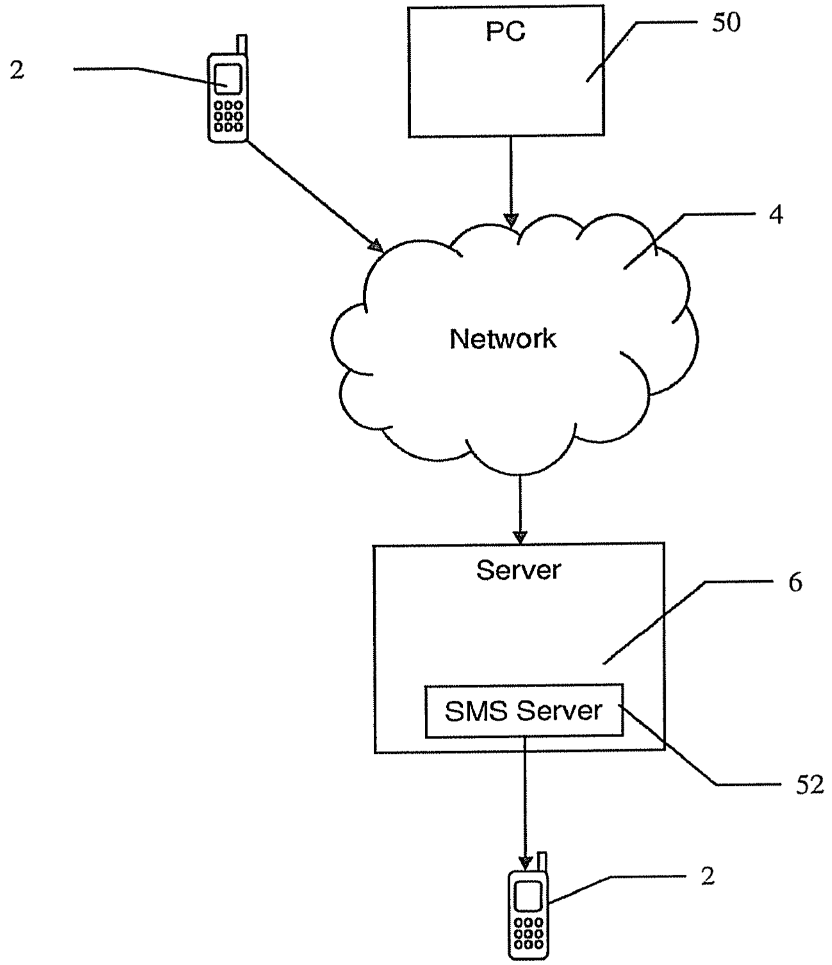
FIG. 4 illustrates an example of the over-the-air configuration of the user's gaming preferences.

Referring now to FIG. 4, a PC 50 connected to the network 4 via the internet is utilised by a user to set preferences. Alternatively a mobile device 2 is utilised by the user to connect to the network 4 to set the preferences. Via network 4, and PC 50, the user inputs the preferences into the server 6. Server 6 includes, among other components, an SMS server 52 which is utilised by the server 6 to send data to the mobile device 2. The SMS message contains information regarding the new user preferences. The SMS is configured in such a way that it automatically updates the mobile device with the new preferences.

Alternatively, user preferences may be transferred from one mobile device to another. For example, one user may transmit his/her preferences to another user to configure the other user's game program or session. This can simplify configuration, especially for a new user, who can in effect copy a friend's configuration settings. The transfer may again occur via an SMS message, either via the server 6 as mentioned above, or more preferably directly, mobile device to mobile device. Upon receipt of the message, the recipient device updates its configuration using the configuration data in the message.

Further examples of the preferences which may be set using this feature are listed below, with further detailed description following:—

- Brand
- Game logic
- Betting preferences
- Place bet
- Seating preferences
    - Where at a table
    - Against which contacts
- Opponent preferences (automatic accepted and declined opponents) per game
    - For example the user could set preferences such as: "I like playing backgammon against Jim, but not poker against Jim"
- Each parameter could be a function of time (e.g. different brand on Sundays)
- Send information about the games to a contact
- Invite a contact to play or compete As mentioned above, the game includes the ability to send gambling application parameters (or user preferences) to contacts. Therefore, a complete, or partial template of a user's preferences is generated and sent to a contact where applicable. The template may include an invitation to join a certain game.

This template is then sent to the contact via SMS, in which the contact(s) are invited to play at a specific poker table, for example. The SMS in this instance is used to set-up the contact's preferences to immediately take them to the desired table where the original user is playing (using the seat allocation aspect of the brushing feature to select a seat for the player). Therefore, it is possible for a user to set-up a private poker table in which the user's contacts (friends) are invited to play.

In this way a user could set-up a "buddy list" which includes a group of contacts that the user wishes to play poker with; for example, when the user wishes to play with those contacts he/she initiates a group SMS message inviting all of the contacts on the "buddy list" to join a game, automatically configuring the contact's phone when they accept the invitation. This would be on a first-come, first-served basis, therefore once the 6-person table was full the remaining contacts would be informed that the table is no longer available.

In certain embodiments, configuration may also be carried out based on observed player behaviour. For example, the online gaming system or game server may analyse current or previous games played by a player to determine game preferences or playing habits of the player. For example, the system may determine preferred game types (e.g. Omaha, Hold'em) or typical play style (e.g. high-risk or low-risk, tight or loose etc) by observing how the user uses the gaming system.

Accordingly, once the player's play style/preferences have been analysed, the system preferably transmits configuration data to the user's device over the communications network to configure the game client at the device in accordance with the results of the analysis. For example, game preferences may be modified to change the types of games presented to the user by default. Alternatively or additionally, game preferences or configuration may be stored centrally at the game server and modified there.

The information resulting from the analysis may also be used to allocate players to games, for example to allocate players to games with players of matching or complementary play styles (as described above in relation to the allocation component or "brush") and may be used to trigger game actions at the user's device (see description of the "observables" feature below).

Shadow Gaming Feature

In the preferred embodiment the online gaming system provides for a shadow gaming feature. The shadow gaming feature allows the user to select, using the over-the-air configuration feature or otherwise, to follow another user's gaming preferences. As a result, instead of the user's mobile device using that user's preferences it will use another user's preferences (this may correspond in some respects to the over-the-air configurable gambling features described above, in particular in relation to direct device-to-device configuration).

A player may wish to follow a given other player's habits (such as a celebrity), and thus automatically always play the most recent game with the most recent brand that the celebrity played. Referring to FIG. 1 or 4, this can be achieved by the celebrity's phone 2 automatically sending messages to the server 6 (over GPRS, MMS, SMS, or other) about game play containing the gambling application parameters in use. Any other user 2 may choose to use those preferences. This feature may be selected while configuring the preferences, thereby negating the requirement for any other preferences to be set-up. Alternatively the user may wish to only follow the other user's gaming in particular instances, for example, they may wish to use the other user's preferences and betting habits for blackjack but not for poker.

Therefore, a user could choose to gamble like a famous footballer, or a famous poker player. The user therefore becomes a "copycat" for the other user.

In a further example, a user may copy not just another player's gambling preferences, but actual gambling actions. For example, a user may choose to shadow a celebrity's bets in a roulette game—if the celebrity places a bet on, say, number 7, a bet would automatically be placed for the user on the same number. This bet may be placed with the same amount, with a multiple/fraction of the "shadowed" bet amount (e.g. half, or double) or alternatively with a predefined amount. Gambling actions could be shadowed live, as they happen, or in response to a request from a user, or when the user first connects to the system. For example, when the user connects to the system, the system may automatically place a wager for the user based on the last action performed by the selected celebrity, or based on a randomly selected action previously performed by the selected celebrity. Preferably the user can specify in their user preferences the user to shadow, which gambling actions to shadow, and/or how to respond to those gambling actions. Actions by another user may also be defined as an "observable", as described in more detail below. Information defining gambling preferences or actions which are to be "shadowed" may be transferred directly between devices 2 via network 4, or may be sent from one device to server 6 from where they are forwarded to other devices as required.

Observables

In preferred embodiments, the system may be configured to automatically perform gambling actions for the user in response to certain events occurring at the user's device, or to certain states detected by the device. These states or events are referred to herein as "observables".

More specifically, observables in this context are defined as 'an observable state or event within or without an application used to trigger one or a series of other events within that application'. Therefore, an observable, or a combination of one or more observables, could be used to trigger an event, such as a gambling action, in a pseudo-random manner.

Where the user device is a mobile device, such as a mobile telephone, typical classes of observable may include communications; user interactions; and sensors. Additionally, events occurring in other applications in the device, or in other games running in the game application, may also be observables. To achieve the above-mentioned pseudo-random nature, an observable used to trigger an action in a game is preferably unrelated to at least that game, and may not be related to the game application at all.

Any single observable may be used independently, or in combination with any other observable. All of the observables and the events they trigger are determined by the user by setting preferences. The user can use the over-the-air configuration feature in order to accomplish this task.

Here follows a list of examples of observable events that could initiate another event or could be used in combination to initiate a separate event in relation to a mobile phone/device:—

- A received communication (defined as an MMS, SMS, email, phone call, or any other form of communication with another person or machine), possibly from one or more specified persons. For example, the observable event could be a call from a specific person with whom the player associates 'luck'.
- Content of a received call or message (e.g. specific words appearing in a text message, or the audio content could be analysed for specific characteristics or words)
- Other information about call, messaging or other communications events, e.g. sender/recipient, call length, text length, MMS picture content
- The observable event could be based on a phone's call register (missed, received, called or currently actioned call) for instance when a person has a certain number (possibly a lucky number to that individual) of missed or received calls from a contact/contacts within a set time period; or on voice mails stored at the phone or remotely (e.g. the number of unheard voice mails)
- The time of day
- Light conditions (measured by a light sensor or standard phone camera)
- The ambient temperature.
- Phone vibration.
- Images observed by the camera on a phone (i.e. a certain object, such as a face)
- Sequences of keys pressed on the phone (i.e. whenever the sequence "007" is used when dialing a telephone number)
- Other user inputs, for example hyperlinks selected in web/wap browser
- Network/WAP portal used by the user, or user's MS ISDN
- Gambling application demands
- The activation or operation of other applications (thereby creating a possible cascading effect)
- Voice recognition
- Day of the year (i.e. birthday)
- Screen contents
- Configuration/status of mobile device, e.g. whether or not Bluetooth is activated; the remaining battery power; network signal strength

- Available credit
- Device's/user's current location (obtained using GPS on the mobile device or other location determining technology, for example cell-based)
- Motion sensor within the mobile device (i.e. the phone could be used to roll the dice in a game of craps)
- Camera input—the image could be analysed and an event triggered if the image matches certain criteria, e.g. as to colour/contrast; the image could also be analysed over time, with detected changes triggering events
- Microphone input—detection of certain types of noise (loudness, pitch) or even recognising specific sounds (e.g. words)
- The observable event could also be an action within a gaming application (for example folding in poker could be used to trigger blackjack)

As mentioned above these observables could be used in combination, for instance:

- Time of day and person calling
- Time of day and location—if a user is at a certain place at a certain time, an event is triggered
- Day of the year and number of calls received (i.e. if date within a month equals number of calls received during that month/day)
- Phone image and time of day Any number of observables may be combined together to produce the desired result.

The observable events above could be used to trigger a variety of game actions relating to one or more games. For example, an observable could trigger starting or ending a game, or carrying out an action within a game, such as Poker, Casino, Bingo, and Betting, both on the phone itself and through a central server. For instance:—

- An observable could initiate a spin of the roulette wheel, betting preset numbers.
- An observable could trigger a bet on a slot machine. For example, an incoming call could trigger a slot machine game (possibly with associated sound effects), which in effect adopts the function of (and may take the place of) a ring tone
- Replace a default ring tone on a phone with a video poker hand.
- Use the green call button on a phone to accept a bet and phone call
- Playing a defined amount of time on one table could trigger the award of a bonus, or cause the player to be moved to another, higher-stakes table
- The game system could use the "location" observable to present different games to the user based on location, e.g. a country-themed game could be presented when abroad, or a medieval-themed game could be presented when the user is near the Tower of London.
- Loss of signal could trigger an offline game, and the user could automatically be returned to an online game when the signal is reacquired
- An observable could trigger the configuring of a game (described in more detail later)
- Some characteristic or parameter relating to the game could be modified in response to an observable, e.g. credit may be awarded or taken away (or passed to another player), or the game difficulty could be increased or decreased
- The device status/configuration (possibly not related to the game itself) could be modified in response to the observable, e.g. the volume or screen brightness could be changed
- An event could initiate an SMS message to a contact to provide information on the game being played or invite them to join the game, e.g. to join a specific poker table.

In the example of using an observable to initiate an SMS to a contact to invite them to a specific poker table the SMS could include specific configuration information. The information would automatically configure the contact's phone to take them to the specific poker table upon acceptance of the invite (see the description of the over-the-air configuration feature above). This feature is available to all community games, and is not just limited to poker. As mobile devices are generally always on, and always connected, this feature enables a group of friends to initiate a gaming session quickly and easily, with no requirement of fixed locations, as with online PC gaming.

The relationship between observable and triggered game action may be fixed, so that the same observable always triggers the action defined for that observable. Alternatively, a random element may be introduced. For example, the game action performed in response to an observable may be selected randomly, for example from a defined set of possible actions. For example, a random event could be triggered at certain times of the day. As a further alternative, the defined (or randomly selected) event may be triggered only some of the times that the corresponding observable is detected. This may be determined (pseudo-)randomly, i.e. the event is triggered in response to the observable with a certain probability.

Apart from triggering the game action, information from the observables may also be used to provide some parameter for the game action. For example, a roulette game could be triggered in response to the receipt of a message, with a bet automatically placed on a number corresponding to the time the message is received or the length of the message (or corresponding to the number of texts received during the day at that point).

In most cases (though there may be some exceptions), observables are typically unrelated to (disconnected from) at least the action that they are used to trigger; they may be unrelated to the game in relation to which an action is triggered; and they may be unrelated to the game program as a whole. They may be related or unrelated to the device (e.g. mobile phone) on which the game is being run, or unrelated to the normal operation of that device. They may be completely unrelated to the device and communications network. These varying degrees of unrelatedness between the observable on the one hand and the game action it triggers on the other hand can give rise to a random or pseudo-random effect—i.e. the triggered events may often happen unexpectedly or surprisingly. This can improve the gaming experience, in particular for wagering games.

Figure 5:
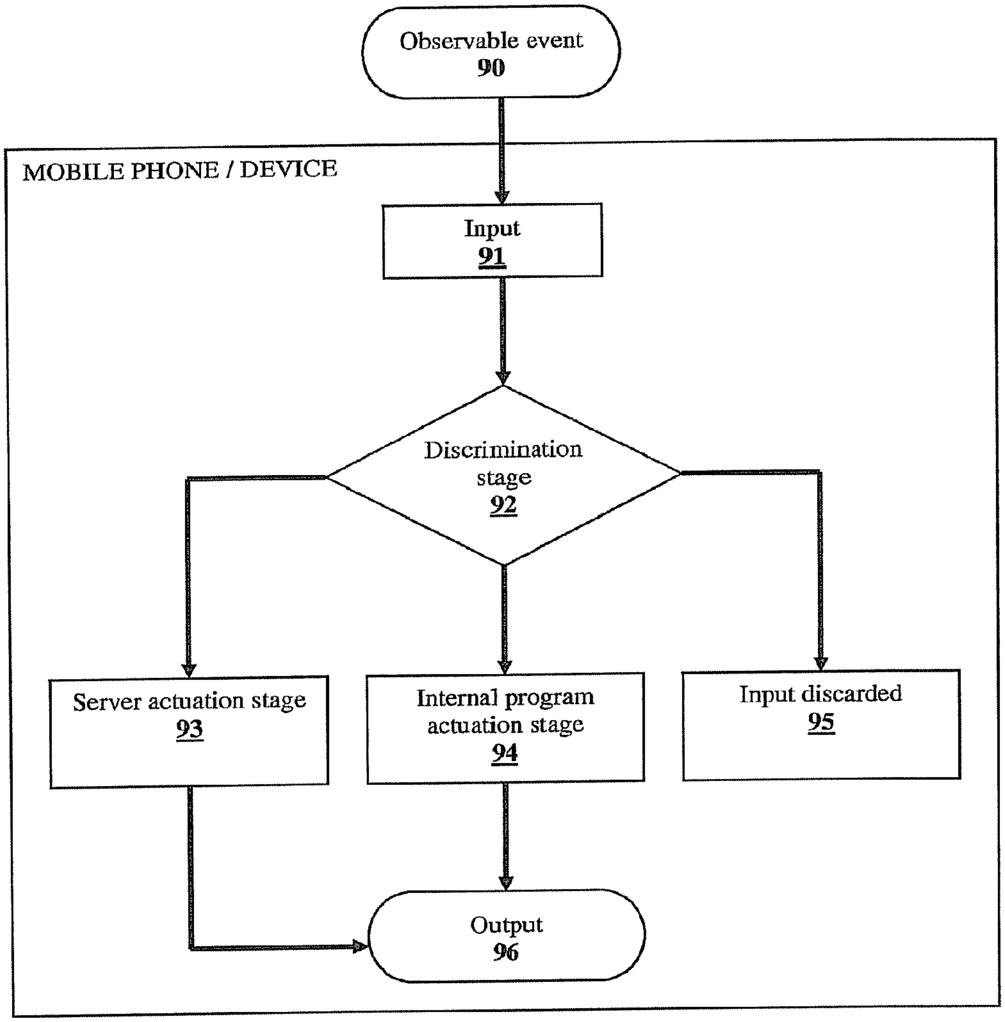
FIG. 5 is a flow diagram illustrating the sequence of events following recognition of an observable.

FIG. 5 provides a flow diagram of the processes involved in acting upon an observable event. An observable event, 90, as described above, e.g. an incoming phone call from a particular person, is registered. This observable event is turned into data which can be processed, input 91. The application on the phone, which has predefined preferences, then makes the decision, at the discrimination stage 92, as to whether the input is to be acted upon, depending on those preferences. If the input is not defined to initiate an event, it is discarded, 95. If the input is defined as an actionable observable then depending on the type of action required the information is either sent to the server, the server actuation stage 93, or is handled internally by the mobile phone/device, the internal program actuation stage 94. The appropriate action defined for the detected observable is then taken by the server/mobile client, the output stage 96, for example to initiate the appropriate application, place a bet in a game, or send an SMS to a contact as in the examples above.

The observable feature may therefore be used to initiate multiple gambling events on the mobile device. In a traditional online PC gambling application the user is able to have multiple gambling games open. Due to the limitations of the mobile screen it is often not possible to have multiple games viewable at the same time. Observables may therefore be used to initiate gambling events while playing a poker-type game, for example. In this situation the user could set-up their observables preferences to initiate a blackjack application whenever they fold a hand. This feature therefore allows the user to maximise the time spent playing games on the phone during any one session. There are many other examples in which an action within a game may be used as an observable, such as when a player makes a bet or wins a large pot.

In an alternative the observable could be the action of running an application, for example a poker-type game, which then initiates a further game, such as blackjack. The user could therefore set-up their mobile device to automatically initiate the applications that they require every time they play a certain game.

In a further example the observable could trigger a cascade of events. An observable, such as the initiation of a poker-type game by one user will be an observable for another user, that will be an observable for another game for that user, that will be an observable for a further user and so on. Thus the observable mechanism could in some circumstances initiate a long cascade of events.

Due to the consequences of the use of observables, users have the ability to opt-out of any observable type actions. Using the preferences, which could be set-up on the mobile device or using over-the-air configuration, a user may select and deselect any observable that his/her device is capable of recognising. The user may also combine the observables, using Boolean operators to produce the desired effect.

The client game application provided on the mobile device preferably allows the user to participate in multiple games at the same time (either of the same game type or of different game types). Given the small screen space, however, the application preferably displays, and allows interaction with, one game at a time. The user can preferably switch between active games (for example moving up or down a defined sequence, or by explicitly selecting a given game). Additionally, as mentioned above, observables may be used to automatically switch between games. In particular, an event in one game may trigger the switch to another, already running game. For example, if the player withdraws from a round in a game (e.g. folding in Poker), the game application may automatically switch to another game. More generally, the game application may switch to another game at the start of or during a period of inactivity for the player. In this way, the waiting time between hands in the Poker game can be filled with other gaming activity, thereby maximising the player's play time. Similarly, the game application may switch to another game while the player is waiting for a scheduled tournament to start.

As mentioned above, in addition to switching between currently running games, the game application may also initiate a new game in response to an observable, and then switch the user interface to the new game. The observable may be used to trigger the brushing mechanism described previously (i.e. the allocation component 10, FIG. 1) to select a suitable game for the user As a further example, the outcome of one gaming event can be used to determine the next game played, or the next action performed. In this way, the gaming experience can be extended by automatically proceeding to the next game/action.

In the above examples, game actions are triggered directly in response to detection of a given observable (or combination of observables). In an alternative approach, observables may also be used to trigger configuration actions in relation to the game(s) provided, i.e. to modify the game set-up.

For example, default preferred game types, betting limits and the like (as specified in user preferences) could be modified in response to a communications event, the time of day, the location (or a change of location) or any other observable. If, for example, a user's preferred game type is changed in response to an observable, then the next time the user starts the game program, the allocation component will automatically allocate the player to a game of the new type.

As another example, if it is observed that a player deposits a large amount of money into their betting account, then the player's preferences could be configured so that in future he would be taken to high stakes games.

The user interface used by the player can also be an observable, and therefore drive the type of game played. For example, if the player is using a mobile device with a small screen then games that are not graphically intense will be provided. However, if the player is using a PDA type device then games that require large screens to show large amounts of in-game actions will be provided. (the type of user interface could be determined by the actual hardware, the platform, or even the firmware).

In general the gaming applications can preferably be skinned to provide different 'looks' to the game to appeal to different audiences. For example slot machines may be skinned; the theme of the skin may be for a charity or for a commercial sponsor, with the pictures on the slots being related to the sponsor company. In some cases the user may be able to choose a skin (via user preferences).

Alternatively, a skin may be selected based on an observable. For example, skins may be selected based on location, such as the country or city the mobile device is located in.

Instead of triggering game actions in response to non-game observables, events or conditions within a game can also be observables, for example to trigger game events in other games. For example, a particularly fortuitous event, such as four-of-a-kind in poker, could trigger a bonus game. Statistical information concerning a current game could also be used as an observable, e.g. to trigger a bonus game if a user has won or lost a certain number or proportion of hands, or to end a game/take the user to a new game in response to perceived unfavourable conditions (e.g. a lack of balance on a roulette table because of a predominance of red over black numbers).

Alternatively, a game event can trigger an event in the phone external to the game program, for example a communications event. As an example, in response to a significant win, a message (e.g. SMS, MMS) could be transmitted to one or more predefined contacts (for example any contacts stored in the phone who are also users of the game service) informing them of the win, a call could be placed automatically or an appointment could be automatically scheduled in the phone's calendar program to meet up with his/her friends to celebrate the win.

A given observable (which may be a defined state or event or a combination of states and/or events) can lead to multiple game actions or configuration actions. For example, an observable may trigger the set-up of a private table tournament.

The above description has given a large variety of examples of different types of observables that may be detected, and of different types of actions that may be performed in response to the observables. The detection and processing of observables by a device (in this example a mobile telephone) will now be described in more detail with reference to FIG. 8.

The mobile device comprises storage means 100 for storing software, configuration and operational data, processing means 102 for executing software components, and a set of hardware devices 104, in particular for input/output purposes. The storage means 100 may be provided, for example, by volatile memory (RAM), a permanent storage device, such as FLASH ROM, a memory card reader or a hard disk drive, or a combination of different storage devices. Processing means 102 may be provided by a processor (CPU) or a set of cooperating processors.

The storage means 100 may store the game software 106 itself, for execution by the processor 102. Additionally, the storage means preferably stores game configuration data 108, game status data 110, other device configuration/status data 112 and an observables table 114.

Game configuration data 108 may include user preferences, for example relating to preferred game types and betting limits. Additionally, game configuration data may define operational settings, for example relating to the visual appearance of the game program's user interface (e.g. colours, fonts), default game servers and the like.

Game state data 110 defines the game status of one or more games in progress. In preferred embodiments, the remote game server controls the execution of the game and therefore keeps track of game status in detail (e.g. quantities bet, whose turn it is etc.), and the game state data stored at the device may be less detailed; for example it may merely identify the games the device is currently participating in. However, the game state data may nevertheless track additional game status information for the purpose of detecting observables, even if that information is not required to run the game at the device. Additionally, some games may be run locally at the device (e.g. single-player games), in which case the full game state would be recorded in game status data 110.

Other device configuration or status data 112 may also be stored which does not relate (directly) to the game program. This may relate to configuration or status of hardware components of the device or to configuration or status of other applications/programs running in the device.

Observables table 114 defines the observables that are to be detected, and for each observable, the action to be carried out in response to detection of the observable. The observables table may specify additional information, such as a probability that the specified action should be taken in response to an observable being detected.

The table may link multiple alternative observables to the same action (each triggering the action) or may specify that a combination of observables must occur to trigger an action. Additionally, a single observable may be linked to multiple actions, either to indicate that each of the actions are to be carried out in response to the observable (possibly in a specified sequence), or to indicate that one of the actions is to be selected, for example randomly. In this case the table may again specify a probability for each action, an action being selected randomly in accordance with the probabilities.

The processor 102 may execute a number of software components. A game operating component 116 provides the main game functionality (typically acting as a game client and interacting with a remote game server). Other applications 118 may also be provided for execution on the device which are not related to the game program, for example a calendar application, calculator application, or other games.

Observables detection component 120 is provided to detect the relevant observables, as defined in observables table 114, and instruct the game operating component 116 to carry out the corresponding game action in response to detection of one of the defined observables.

Observables configuration component 122 allows the contents of the observables table to be modified. This may occur in response to a configuration message received over the communications network (that is, the observables are configured remotely). Alternatively or additionally, the observables configuration component may provide a user interface to allow the user to configure the observables. In this way, the user can set up which actions should be triggered in response to which events, and specify any relevant action parameters, for example a wager amount for a bet which is to be placed in response to a telephone call.

The software components discussed above may run at the same time or at different times. For example, the observables detection component 120 is typically active at the same time as the game operating component 116 (both may form part of a single application), whilst the observables configuration component 122 may be invoked as and when needed and not necessarily at the same time that the game program is being run.

The hardware I/O devices 104 comprise the standard telephone user interface components 124 (e.g. screen, keypad, microphone, speaker), along with other external/internal sensors 126 (e.g. camera, GPS, temperature sensor, battery voltage sensor etc.). A communications subsystem 128 is also provided to manage interaction with the communications network, e.g. for the making and receiving of calls, sending/receiving of messages, Internet access and the like.

In operation, the game operating component 116 runs one or more games for the user by interacting with a remote game server. The observables detection component 120 monitors the various elements of the system to determine if an observable, that is some predefined state or event, has occurred. If an observable which is defined in the observables table 114 occurs then the observables detection component 120 determines the appropriate action from the table and instructs the game operating component to carry out the action. In some cases some other action, external to the game program, may be required, in which case the observables detection component also initiates the relevant action (e.g. to send an SMS using communications subsystem 128).

The observables detected may relate to game status data 110 (for example when an observable in one game triggers an action in relation to another game), to other device configuration/status data 112, or to another currently running application 118. Alternatively, the observable may relate to input received from standard user interface devices 124, other sensors 126 or communications subsystem 128.

Though a large number of examples of possible observables have been given above, for practical purposes, the system will typically be configured to work with a defined set of observables which are detectable by the observables detection component, with observables table 114 specifying actions for some or all of those available observables (similarly, there may be a defined set of available actions which can be performed in response to the observables).

Detection can occur in a number of ways. The observables detection component 120 may regularly poll the potential sources of observables (e.g. sensors) to obtain information on their current states or inputs. In some cases, the sources of observables may be configured to alert the observables detection component 120 when certain conditions arise. This may correspond immediately to detection of an observable, or alternatively the detection component may first analyse data received from the source to determine whether it meets certain criteria, and/or may in some cases request further information from the relevant source.

Analysis of data received from a source may, for example, take the form of comparing a temperature received from a temperature sensor to a threshold, or analysing the image content of one or more images received from a camera to determine whether the image content meets certain criteria for example to detect certain colours or objects.

As previously mentioned, the observables configuration component 122 is used to specify the link between observables and actions to be triggered. This may allow arbitrary mapping between the available observables and the available game actions. Configuration can occur automatically over the network, or can be carried out manually by the user. Thus, as an example, the user may specify:

- that receipt of an SMS message should trigger a game action
- that the message should be received from one or more specified contacts
- the game to be initiated in response to the message;
- the game outcome and wager amount of a bet that is to be placed in the game.

This allows the user to define a trigger such as "when Jack or Peter send me a message, start the roulette game, and bet £1 on red". Various other specific examples have already been described above, and many more are possible.

In other embodiments, instead of using the observables table 114, observable/action triggers may be hard-coded within the game program. Though less flexible, this solution may be appropriate where only a limited range of observables/action triggers are catered for, and these are not intended to be changed easily or frequently.

The following sections describe details of certain aspects of the implementation of the game system, in an exemplary embodiment.

Compatibility

In order to provide the mobile application with compatibility with multiple types of mobile devices, each with varying screen sizes and operating systems—Symbian, Windows CE or a proprietary system—each phone is catered for individually. The screen images, for example of a poker table, are individually drafted, to ensure correct scaling, for each phone requiring compatibility. As a further example, the numbers shown on the screen, current table balance for example, are also individually drafted for each device.

Furthermore, the phone's operating system is catered for by compiling the software individually for each appropriate system. A resource manager compiles all of the fonts, graphics and so on, into a compressed format so that it is small and easy to handle on the mobile device, given its limited processing capacity.

Server

Figure 6:
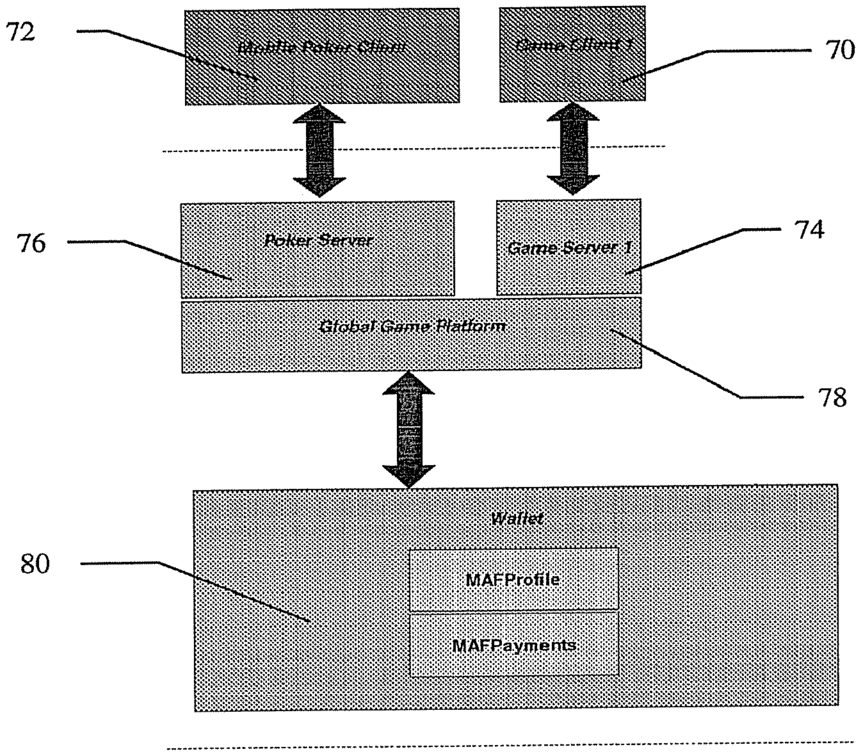
FIG. 6 illustrates the overall system including the mobile client, server, and a payment system.

The server is built on top of the gaming platform, GP. The main hook is via the Session object, which the server overrides. The components provided by the GP and its default implementation, include:

- Communications & Security
- Session Management
- Account Management
- Authentication
- Cashier In a preferred embodiment, see FIG. 6, the games server 74 and the poker server 76 both sit on the global game platform 78. The global game platform 78 functions as a server in which all of the individual games server sit, therefore the poker server 76 and any number of other games servers 74, are actioned through the global game platform. The clients communicate with the server via the network (not shown). Below the global game platform 78 is the wallet 80 in which is held the user's account details; which include the user account balance etc.

Application Architecture

The preferred embodiment of the invention is run as a server/thin client arrangement. Therefore, the majority of the processing is accomplished at the server, with the instructions then sent from the server to the thin client detailing the screen update. The thin client transmits the user actions from the mobile device to the server to be dealt with. This greatly reduces the processing required in the mobile device and therefore improves game speed and allows the thin client to remain small. Preferably, all of the screen updates come from the server. Another advantage of this system is that the user can be reconnected to the game very quickly after a loss of connection.

A limited amount of information is sent between the thin client and the server, again, in order to reduce the lag between user actions and a screen update. For example, the server sends a bit pattern to the client, preferably 16 bits to update and create the interface screen.

Application Environment

The preferred embodiment utilises a mobile device; specifically a mobile phone, to connect to the server 6 via network 4. A brief description of the communication protocols follows.

Mobile phones ("Phones") are linked to the internet using packet communications such as GPRS.

- Phones use GPRS and other packet based wireless technologies to connect to "local area network".
- Phones address an access point ("Access Point Name", "APN"), which is a computer with an IP address within the operator address space
- The APN looks at the identity of the phone (or in fact the MS-ISDN, the phone number) to deduce whether this phone is allowed to talk to the APN
- If the phone is allowed to talk to the APN, then the APN can obtain a temporary IP address from the real internet for the phone, and connect the phone to the internet.

The phone communicates using a protocol with an APN. The protocol used by the phone to connect to the internet depends on the phone. For example, it might be a low level protocol based directly on TCP/IP, or higher level communication with, for instance, http over TCP/IP—or the mobile phone protocol WTP used in wap APN gateways. Low-level protocols on TCP/IP are sometimes referred to as socket based communications.

Independently thereof and at a less low level, the phone uses an operating system such as Symbian, Windows CE or a proprietary operating system by the relevant phone manufacturer.

Independently thereof and at a slightly higher level, the thin client gaming application sits on top of the mobile devices operating system, along with other application such as email, an internet browser, etc.

The mobile device may use different connection protocols for each application, for example, the device may use a TCP/IP APN as the default gateway for email, a wap WTP APN as default for browsing, and a wap WTP APN for a downloaded Java game, and a TCP/IP APN for a preinstalled Symbian calendar. In the preferred embodiment the mobile device uses a TCP/IP APN to connect to the network in order to reduce the latency times and thereby improve the playability of the gaming system.

Server Application

The server component of the gaming system is preferably implemented using an object-oriented framework, which simplifies reuse of components in other similar applications (e.g. a multiplayer blackjack application). For example, the system may be implemented in Java.

The following are examples of some classes used in an example implementation:

- PokerServer
- Session
  - PokerSession
- game
  - Table
  - Dealer
  - Player
  - Ring
  - Action
  - chips
    - Bet
    - Pot
    - Stack
    - Contribution
    - Split
  - cards
    - Card
    - Hand
    - Deck
- lobby
  - Brush
  - WaitingList
- model
  - Limits
  - BuyIn The PokerServer class is responsible for managing the lobby and game elements, as well as ancillary tasks such as daily reports. When it is created it initialises the server based on configuration files and database settings. It runs on its own thread and exposes management operations, such as start and stop. It is the central object that can act system-wide and provides a single place to store and retrieve core objects, making them available as necessary to other components.

A player's connection to the system is represented by a "PokerSession" class. Individual games are represented by a "table" class. As is clear from the above example, elements of the game itself, such as cards, bets, pots and the like are also represented by classes, as are game attributes such as limits and buy-in values (grouped under "model" above).

A "Lobby" class is also provided which implements the brush mechanism, which takes the place of a conventional menu/list-based lobby (though in some embodiments, the brush mechanism could be provided in addition to such a menu/list-based lobby).

It is the primary job of the lobby to implement the brush. It does this using a combination of waiting lists and a state model, containing all running tables, including details of empty seats. In a preferred implementation, many of the lists provided by the lobby are generalised into a WaitingList object. The brush runs multiple such lists. For instance, and depending on the configured limits, the brush might be running a set of lists such as the following:

- props:WaitingList (all props logged-in and available to play)
- bots:WaitingList (all bots logged-in and available to play)
- guests:WaitingList (all guest accounts free and available to play)
- Real Money
  - Heads-Up
    - 20/40p:WaitingList
    - 50/100p:WaitingList
  - 6-Max
    - 20/40p:WaitingList
    - 50/100p:WaitingList
    - 100/200p:Waiting List
- Play Money
  - headsUp:WaitingList
  - sixMax:WaitingList The first three lists record available participants (including computer-controlled players referred to as bots), while the latter lists record participants waiting to join specific types of games. A player is added to the appropriate waiting list if no table matching the player's preferences is available when the request to join a game is received.

While the prime real-money 6-max waiting lists are not expected to contain any players for any significant amount of time, other waiting lists such as heads-up may keep players waiting for longer. Therefore a well-defined waiting list mechanism is employed and generalised for all cases.

In alternative implementations, instead of placing players on waiting lists, a new table may be created for a player when no table matching that player's requirements is available. Alternatively, new tables may be created as long as a maximum table limit (overall, or within a given game type) has not been reached. Once the maximum table limit has been reached, waiting lists are then used.

In addition to waiting lists, the Brush maintains game state information for running tables in detail. Using the waiting lists and state information, the Brush decides on which tables and in which seats to sit waiting players. As tables become full it is the job of the Brush to start new tables, and as tables become empty it also closes them. A table, as described below, exists in its own right and manages its own threads, and is not in control of starting and stopping itself.

The brush operates as previously described. The table state is represented using a data model which provides sufficient information to make efficient decisions in order to implement such operations. Referring back to FIG. 2, this preferably includes a master list 14 of running tables in a well-defined order that makes it simple and efficient to identify the appropriate table and seat at which to sit new players, with each table including attributes 22 and game state data 20, including, for example:

- Table currency (real or play-money)
- Table handedness (heads-up or 6-max)
- Table limits (20/40, 50/100, 100/200p)
- Buy-in
- Empty seats (according to table balancing rules)
- Seat positions (according to between-the-blinds rules)

As the Brush maintains the waiting lists and table state information, it can also provide operational data to an external management or reporting system, for example:

- Number of waiting players (and average wait time, etc.)
- Coverage of bots and props (and warnings when coverage is below thresholds)
- Running tables and betting statistics (average hands per hour, etc.)

Player Menu and Preference Interface

In one example, the lobby menu presented to the player may include the following options:

- Play for Real Link
- Play for Fun Link
- Cashier Link
- Profile Link

Instructions Link
Options Link
Exit Link

The first two links initiate the brush mechanism for "real money" and "play money" games respectively. The "profile" link provides access to the user preference wizard, allowing the player to define their preferred game type. In this example, the user may separately define their preferred "real money" and "play money" game types, with games of the selected types being initiated via the "play for real" and "play for fun" links.

The available game types are dependent on constants set by the game server 6 at start-up of the gaming system. In order to select the player's preferred type of game and options such as buy-in, the preference wizard provided by the preference manager 12 takes the player through the following wizard-style options:

- Play for Real
  - Heads-Up Tables:
    - £0.20/0.40 Limit
      - Buy-in: £2.50/£5.00/£7.50
    - £0.50/1.00 Limit
      - Buy-in: £5.00/£10.00/£15.00
  - 6-Max Tables
    - £0.20/0.40 Limit
      - Buy-in: £4.00/£8.00/£12.00
    - £0.50/1.00 Limit
      - Buy-in: £10.00/£20.00/£30.00
    - £1.00/2.00 Limit
      - Buy-in: £20.00/£40.00/£60.00
- Play for Fun (one set of limits, automatic buy-in)
  - Heads-Up Tables
  - 6-Max Tables 6-Max tables may not be available, depending on the connection speed, in which case this wizard step is preferably not displayed. There are likely fewer limits available on heads-up tables in order to avoid splitting liquidity. In this example, there are no limit options for play-money; all play-money users play at the same limits.

By specifying values for the various options presented by the wizard, the player can select their preferred game type.

Once the user has navigated the game selection wizard, the client submits the selection to the server in the form of a message, for example "GBP,6,50,100,2000" for a real-money, 6-max, £0.50/1.00 table with a £20 buy-in, or "PLM, 2,0,0" for a play-money heads-up game where there are no defined limits and buy-in is automatic. With this mechanism it is also possible to select indeterminate games, where the server will determine what game to serve, depending on what is available. This may in particular be useful for bots and props. The preference wizard could also allow the player to leave certain parameters unspecified.

The wizard may also present other table information relevant to the selected game type. What is displayed will usually depend on the available screen real estate and may vary depending on the platform. For example, for a £0.20/0.40 table this additional information could include:

Limits=£0.20/0.40
Blinds=£0.10/0.20
Min buy-in=£4.00 (10×the upper-limit)
Max buy-in=£4.00 (30×the upper-limit)
Rake=4% (max £1 per pot)
Disconnection protection=2

None of this information is critical as it can be defined in the rules. It is information that is often available in online poker rooms with a full lobby service and it is information that the server usually has available. There is information that is not relevant when using the described brush mechanism which is therefore typically not displayed, primarily because the player is unable to choose particular tables, including for example:

Number of players
Average hands per hour
Average pot size
Average players in the flop In the described embodiment, the player does not get to select a seat at the table. Instead, the Brush mechanism sits each player in the most effective seat, such as those not between-the-blinds, as already discussed.

Instead of or in addition to providing a wizard interface (typically accessed through a menu option on the main menu) for setting preferences, the preferences, or a subset thereof, may be displayed on the main screen/menu, allowing the user to access and modify them immediately. The preferences presented may be the most important or most commonly modified preferences. For example, the game type (Omaha, Hold'em etc.) and preferred betting limit may be part of the main menu screen. A wizard or other preference interface may then separately be provided to enable modification of all the available preferences.

A player search is preferably provided in order for users to search for other players—the search can be based on playing style, name, location etc. Players found can, for example, be added to a "buddies" list. The system may in some implementations also allow the player to choose to join a game in which a given player is currently participating, instead of using the automatic "brushing" allocation mechanism.

Poker-Type Application

The user interface for an example implementation of a poker-type application will now be described (see also FIG. 3).

In-Game Menu

During a game there are a number of menu items that are accessible. The menu is generally accessed with the right-hand soft-key of the mobile device. A soft-key label is displayed to indicate this. Menu items include:

- Leave/Stay
- History Console
- Chat Message
  - Nice Hand
  - Very Nice Hand
  - Bad Beat
  - Nudge
  - Etc. . . .
- Sounds on/off
- Vibration on/off The left-hand soft-key may also pull down the History Console, and is labelled as such. In the history console the left-hand soft-key closes the console, and is labelled as such. The right-hand soft-key allows the user to filter messages:

All messages
Dealer Only
Dealer Summary

Game Screen

Various aspects of the client can be "skinned" for different appearances depending on the user's preference. The term "skinning" refers to the ability to change the look of the application without changing the function. The aspects of the application that may be "skinned" are listed below:—

- Graphics
  - Splash Screens
  - Card Faces
  - Card Backs

Chips
Table
Menus
Backgrounds
Colours
Text
Sounds
Launch
Congratulations

Game Play

There are two game-play screens (in the poker-type application), one for heads-up and one for 6-max tables. Smaller devices, i.e. those with small screens, do not support 6-max tables and so the server will not serve them. In all other cases the server defines the available games by setting constants at application launch, which will be dependent on the speed of the connection.

Control Panel

A control panel is always visible at the bottom of the screen. This displays:

Player pocket cards
Possible actions
Current rake
Timer

Pocket cards are displayed only when the current player is in. When the current player has folded they are greyed out. At all other times the space is empty, apart from a subtle outline indicating that this is a placeholder for pocket cards.

Possible actions are displayed only when it is the current players turn to act. Possible actions include:

Fold
Check
Call*
Bet*
Raise*
All-In*
Show
Muck
Small*
Big*
Reject

Actions marked with an asterisk* also have monetary values attached. Only certain combinations of the above are displayed at any one time. The complete list of possible combinations follows (all monetary values are examples only):

Small £0.10
Reject
Big £0.20
Reject
Check
Bet £0.20
Fold
Call £0.20+
Raise £0.40+
Fold
Show
Muck All-In is a special case and may appear instead of call, bet or raise at any time. It will not appear instead of the blinds; where a player cannot meet the blind level he will be automatically removed from the table.

The current rake value is displayed on the control panel whenever rake has been taken from the pot. The values are likely to be very small, such as £0.01. The rake value is taken from the Chip Transaction message where chips are moved to the dedicated rake position.

The timer control is displayed whenever it is a players turn to act, both for the current player and any opponents. Each "Action Request" broadcast by the server contains a timeout value that is to be used to immediately start the timer animation. Times are not precise and largely subject to network latency, but the indication is more important than the accuracy. The face is segregated into five-second intervals with 12 segments in total (60 seconds). The final segment flashes rather than disappears as it is by no means accurate; anything may happen during these five seconds, including a forced action by the server; it is unlikely that the server will receive an "Action Response" during this time if the player selects his action now.

Chips

Chips are used to represent real or play money in the game. Their complete and accurate representation is usually an important factor in any betting decision made by a player. Therefore all of them are displayed, all of the time.

All chip movements are specified by Chip Transaction messages that detail precisely how many chips to move from where and to where. However, due to the constraints of the screen, chips are represented notionally, with an exact amount in figures displayed alongside. When animating chip movements, notional amounts of chips are moved from one position to one or more other positions. Sometimes the movement takes place between a position that does not display chip graphics (such as player stacks) and one that does (such as player bet positions), and vice versa. In these cases the movement may be quite abstract, with the specifics detailed below; the important information to get across is that chips moved from one place to another, and this movement flows with the action as it moves around the table.

Main Pot

The main pot, which is the game, is displayed centrally on the table. As rake is taken the amount is shown on the control panel and the main pot debited accordingly. The main pot (in fact all pots) can be split between one or more players at showdown, or in the likely event that a showdown is not reached, then a takedown ensues where the whole pot is dragged to the one remaining player. The splitting or takedown animation will display a notional amount of chips moving from the main pot to the benefiting player stacks.

Side Pots

All side pots are visible at all times. Side pots are just as important as the main pot, as the game is wholly concerned with the current side pot, where the main pot is now largely irrelevant in betting decisions. Side pots are displayed with a number indicator and they are displayed smaller than the main pot, not because they are less important but because there is not much space on the table and they are less likely to come into play than the main pot. Side pots are split or taken down in the same manner as the main pot.

Bets

Player bets are placed in front of the players pocket cards. They are a good indication of who is left in the game (a critical factor in betting decisions) and illustrate action, although the player pocket cards are the final indication of who is in and who is out, as bets do not appear in every betting round. As bets are dragged into the main pot or side pots a notional amount of chips move across the table and into the relevant positions.

Stacks

Player stacks, the amount of chips (money) a player has at the table, are not so critical in fixed limit games. Small stacks generally indicate desperation and therefore are displayed at all times as they do affect the game. In pot-limit and no-limit games the stacks become critical. As players make bets a notional amount of chips is moved from the players stack and animates around the player symbol and into the bet position.

Pocket Cards

The player pocket cards are dealt face down in a twice-around-the-table motion, starting with the player to-the-left-of the dealer. Animation emanates from the left of the community cards (of which there will be none at the time of the pocket cards being dealt). A player holding cards indicates that the player is in the game, whether or not any bets are on the table. A player folding or mucking results in the cards being animated across the table to the left of the community cards, in whatever orientation they are currently (face up or down). A flash message "dealing", will be displayed across the screen at the time of the deal.

Community Cards

Up to five community cards can be dealt into the middle of the table. Not necessarily all of them will be dealt if the game does not go to showdown. In the case of an all-in, any remaining community cards may be dealt simultaneously. Animation emanates from the left of the community cards (of which there will be none at the time of the flop). A flash message "flop", "turn" or "river" will be displayed across the screen as the cards are dealt. When the table is cleared at the end of a game the community cards are animated to the emanating position.

Dealer Button

The dealer button is displayed next to the dealer position and animates around the table in a round-robin fashion between games, usually skipping empty seats. It is possible that the button will not move or that it will be placed in an empty position.

Next to Act

The next player to act is clearly highlighted at all times. From the posting of the small-blind to the final call, one player's position will be highlighted. The action timer in the control panel will apply to this player. During the showdown one or more winners may be highlighted in the same manner.

Messages

There are several classes of messages during the game. Balancing the major events, such as winning hands, and the minor events, such as a fold, will remain in the control of the server at all times. The client provides the mechanisms to display messages, and the server decides which mechanism to use and the text of the message itself. All messages are delivered by the server as Write Console messages.

Action Bubbles

As a player acts the server simultaneously sends a Write Console message with a seat position and the text. The client displays this as a speech bubble above the relevant position. The bubble is either displayed for five seconds, and then removed on timeout, or the next player acts, in which case it is removed immediately. The entire text is formatted by the server and may be up to 12 characters long.

Flash Messages

Certain phases of the game and other major events may be displayed as flash messages across the screen. This may be text such as;

Dealing . . .

The flop . . .

Smokin shows full-house, aces full of kings

Slick wins £999.99 from the main pot

These messages are sometimes critical, sometimes less so and, more often, simply confidence building. Building confidence in the service by clearly showing what just happened, particularly for the novice player and the new customer who has never used the application, or any mobile poker service.

The messages are short and to the point. They are displayed long enough for the player to read, but should not get in the way of the ongoing game. There is no natural timeout at which the message can be cleared, and so a reasonable time such as 5 seconds is used; this may be altered depending on the game type.

During a showdown these messages may come thick and fast and in concert with other events, such as winning hands to highlight and pots to split.

Congratulations Message

If the current player wins this is communicated with a "congratulations" message, part of the media, at such times as the appropriate Write Console message is sent by the server. This will only happen during a showdown.

History Console

All of the above Action Bubbles, Flash Messages and Congratulations Messages are sent as Write Console messages. The Write Console messages will also contain many lower priority messages, which may not be displayed on the game screen. All messages go to the text console, whether or not they have been written elsewhere. The console serves as a recent history of actions and events in a purely text-based format. The console can be pulled down at any time during game-play using the menu key.

Showdowns

Showdowns are a complex sequence of events that can involve many players and many pots. Defining a clear sequence and displaying appropriate and quite detailed information to the players is a difficult balance.

Information that must be displayed clearly includes:

The pot in-play must be indicated

The winning players must be highlighted

The winning amounts must be displayed

The winning hand must be highlighted, every card

The winning hand strength must be displayed "Pair of Deuces, Ace Kicker"

This can happen for every pot.

As the final call is made on the fourth betting round, so the showdown commences. Usually this entails a round of showing and mucking. In this game the showing and mucking of cards is automatic, based on whether the hand beat the previous show or not. This is still a round though. The server evaluates all hands in-turn, and then sends appropriate Sprite Transactions to reveal all the hands that would have been revealed in a live showdown. Sprite Transactions between the server and the thin client initiate screen updates, and include information relating to the portions of the screen that require updating, the view of the cards in this example. Pocket cards are revealed face-up in the positions of the current face-down pocket cards. These are bigger than the face-down cards and will cover some of the player information, such as bet (which will be empty) and possibly stack and nickname. Where the current player reveals cards these will also be shown face-up on the table, in the current player position, as well as the current face-up representation in the control panel. The representation must be clear and potentially all pocket cards may be revealed on the table at the same time, so there is a lot of information on the table. During a showdown it is the pocket cards, community cards and pots that are important, and therefore other information may be obscured; this will depend on the screen size.

Once all cards have been revealed the server will send a Sprite Transaction that indicates to the client which five cards make up the winning hand. The client must highlight the winning hand from the pocket cards and community cards. There may be more than one winner in the case of a split pot, in which case the server will indicate multiple pocket cards to reveal. To emphasise the winners, Action Bubbles are used with text such as "WIN 99.99". And if the current player is the winner, a congratulations message is displayed, along with sound and vibration (subject to optional settings).

At the same time as the winning hand is revealed a Flash Message is delivered. This will contain the absolute hand strength, including relevant kickers. Rather than simply saying "Two Pair", the message will read "Two Pair, Aces and Kings". If kickers came into play then the message will get longer, for example "Two Pair, Aces and Kings, Queen Kicker". At no point should the user be left wondering why he was beat. The Flash Message is displayed across the middle of the screen for some seconds. There is no natural timeout, and therefore the suggested time of 5 seconds should provide enough time for players to read it and ascertain its accuracy from the winning cards, as presently highlighted on the table.

The server sends a Chip Transaction straight after the Flash Message. The client should make the chip movements as the Flash Message is removed after its timeout. The current pot can be split between more than one player. The movements should be clear so as to indicate how the pot was split and to whom.

The online gaming system described herein in various embodiments typically comprises one or more user devices, typically mobile telephones or the like, communicating with a game server.

The user device has been described above with reference to FIG. 8. In accordance with preferred embodiments, the user device is adapted to enable participation in multiple concurrent games as will now be briefly described.

Figure 8:
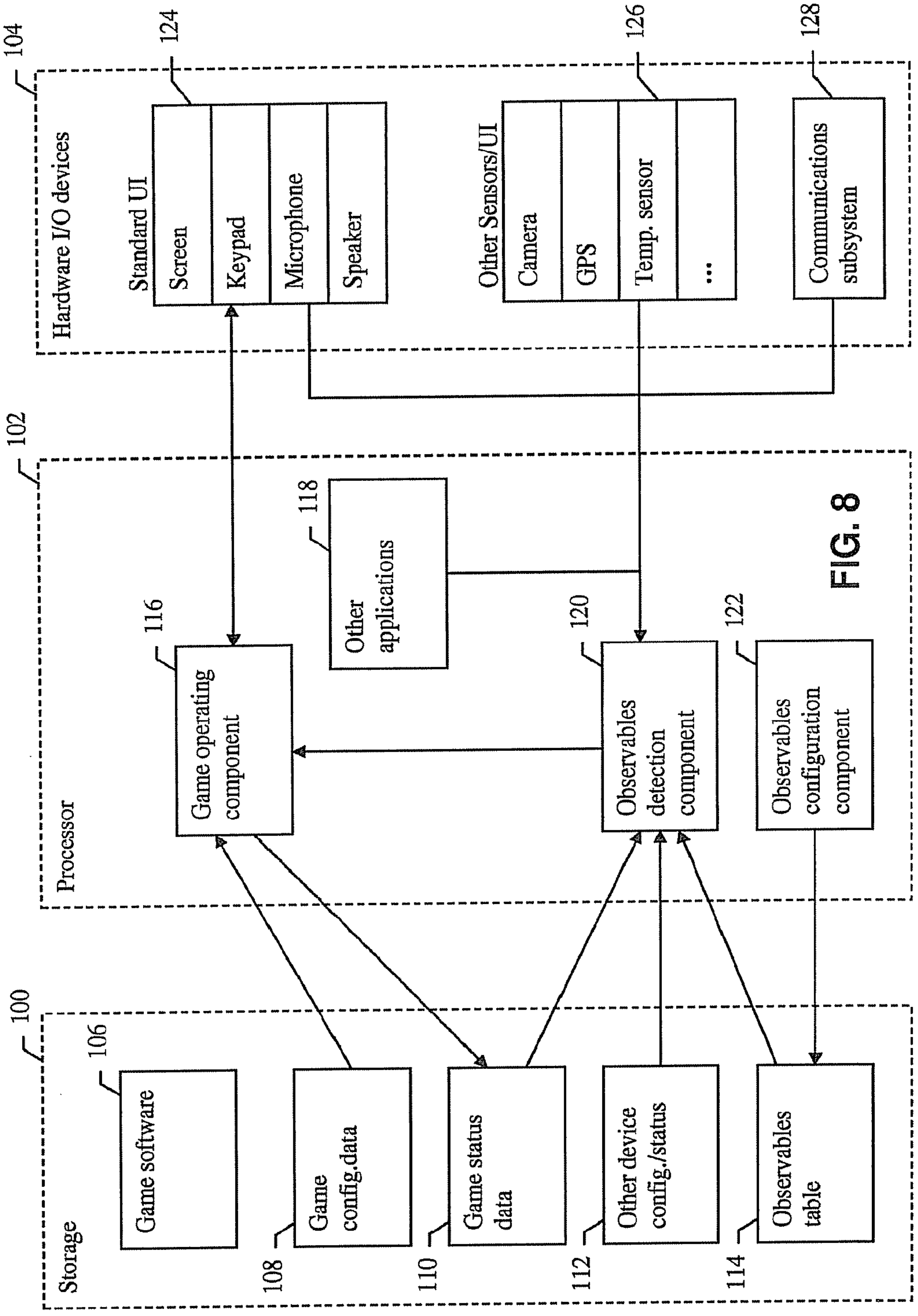
FIG. 8 illustrates a mobile device for running a game program and illustrates the detection of observables at the device.

Referring to FIG. 8, the mobile device is connectable to the online gaming system via the mobile telecommunications network. Specifically, the mobile device comprises means, in the form of communications subsystem 128, for communicating with the online gaming system to participate in a plurality of concurrent games. The device additionally comprises interface means, for example in the form of standard UI components 124 (e.g. keypad, screen) for providing a game interface to a user of the program relating to a current one of the plurality of games.

The game program 116 also provides means for switching the interface to a different one of the plurality of games, for example in response to a user input received from the keypad, or in response to some event in the game (as described in more detail above in relation to the observables feature). When switching from one game to another, the user interface for the first game presented via UI components 124 is replaced with a user interface for the second game, showing the game state of the second game. This information is preferably obtained from game status data 110 (alternatively, the required information may be obtained from the remote game server, though this may make switching less responsive). In this way, the user can participate in multiple concurrent games, despite the limited user interface capabilities (in particular screen space) typically available in such devices.

Figure 9:
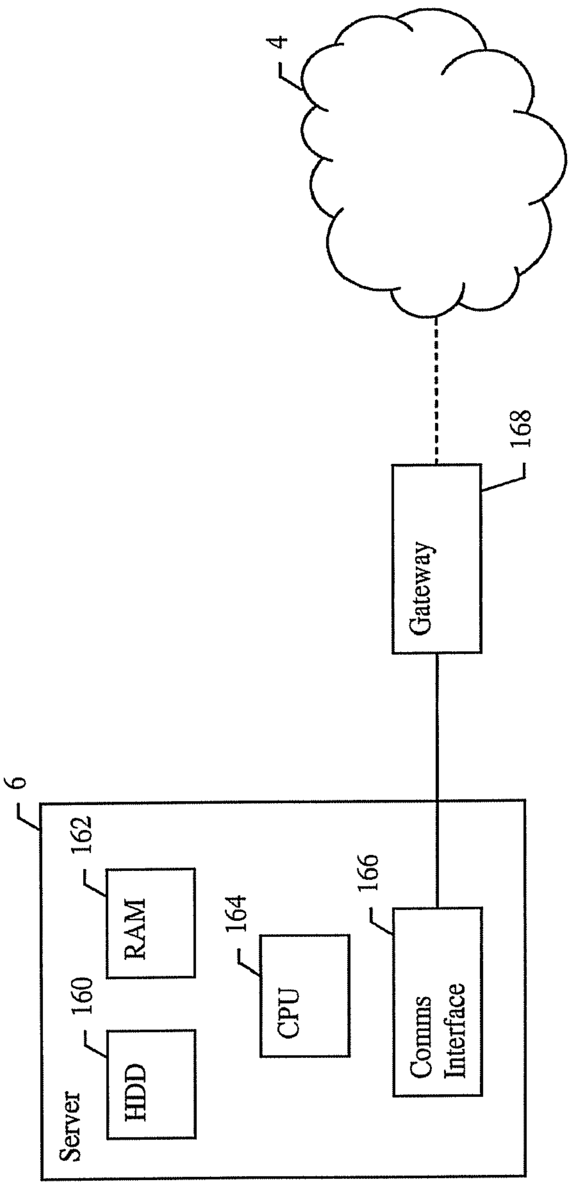
FIG. 9 illustrates components of a game server.

The game server is illustrated in more detail in FIG. 9. The server 6 typically comprises (amongst other components) permanent storage 160 (e.g. a hard disk drive) for storing game software and player information and preferences. CPU 164 controls execution of the game software to operate the plurality of games provided by the gaming system. RAM 162 stores game software during execution, along with game data (e.g. game data 14 shown in FIG. 2). The game software typically operates in the context of a server operating system (not shown). A communications interface 166 is provided to enable communication with devices connected to mobile communications network 4. Communication may occur via a gateway 168, which provides access to the mobile communications network 4 from other networks, e.g. a LAN or the Internet.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. An online gaming system adapted to provide access to a plurality of concurrent multiplayer games, comprising:

a non-transitory computer readable storage medium storing player preference data defining one or more game preferences for each player, and game play history information representative of one more past play events in a respective game of the plurality of games; and a processor configured to:

receive a request from a player to join a game;

access stored preference data defining one or more game preferences for the player;

identify two or more of the plurality of games matching the preference data;

access stored game play history information of the identified two or more of the plurality of games;

select one of identified two more of the plurality of games for the player in dependence on the information; and allocate the player to the selected game.

2. The online gaming system of claim 1, wherein the request to join a game corresponds to at least one or more of: an end of an existing game in which the player was participating; disconnection of the player from an existing game in which the player is participating; and the current number of players of an existing game in which the player is participating falling below a defined threshold.

3. The online gaming system of claim 1, wherein the stored game history information includes a characteristic of the game.

4. The online gaming system of claim 3, wherein the characteristic includes one or more of: speed of play in the game, wagers placed in the game, a percentage of players to reach a defined stage in the game or in individual rounds of the game, or in a poker-style game, a percentage of players to see the flop.

5. The online gaming system of claim 1, wherein the processor further configured to:

analyze data representative of one or more past play events of a given game to determine a characteristic of the game; and store the characteristic in the stored game history information.

6. The online gaming system of claim 1, wherein the processor further configured to:

identify a current game which meets a predetermined termination criterion;

for each player currently participating in the identified game, select another of plurality of games and allocate the player to the selected game; and terminate the identified game.

7. The online gaming system of claim 1, wherein the player communicates with the online game system via a client device over a telecommunication network, and wherein the processor further configured to:

monitor a connection state for the client device to the online gaming system;

in response to detecting a disconnection of the client device from the online gaming system, pause the game; and in response to the disconnected client device reconnecting to the online gaming system, join the player to the paused game and resuming the game.

8. A computer-implemented method to provide access to a plurality of concurrent multiplayer games, the method comprising:

receiving a request from a player to join a game;

based on stored preference data defining one or more game preferences for the player, identifying two or more of the plurality of games matching the preference data;

based on stored game play history information of the identified two or more of the plurality of games, selecting one of identified two more of the plurality of games for the player; and allocating the player to the selected game.

9. The method of claim 8, wherein the request to join a game corresponds to at least one or more of: an end of an existing game in which the player was participating; disconnection of the player from an existing game in which the player is participating; and the current number of players of an existing game in which the player is participating falling below a defined threshold.

10. The method of claim 8, wherein the stored game history information includes a characteristic of the game.

11. The method of claim 10, wherein the characteristic includes one or more of: speed of play in the game, wagers placed in the game, a percentage of players to reach a defined stage in the game or in individual rounds of the game, or in a poker-style game, a percentage of players to see the flop.

12. The method of claim 8, further comprising:

analyzing data representative of one or more past play events of a given game to determine a characteristic of the game; and storing the characteristic in the stored game history information.

13. The method of claim 8, further comprising:

identifying a current game which meets a predetermined termination criterion;

for each player currently participating in the identified game, selecting another of plurality of games and allocate the player to the selected game; and terminating the identified game.

14. The method of claim 8, wherein the player communicates with the online game system via a client device over a telecommunication network, and the method further comprising:

monitoring a connection state for the client device to the online gaming system;

in response to detecting a disconnection of the client device from the online gaming system, pausing the game; and in response to the disconnected client device reconnecting to the online gaming system, joining the player to the paused game and resuming the game.

15. A non-transitory computer-readable storage medium including instructions that, when executed by a processor, perform the steps of:

receiving a request from a player to join a game;

based on stored preference data defining one or more game preferences for the player, identifying two or more of the plurality of games matching the preference data;

based on stored game play history information of the identified two or more of the plurality of games, selecting one of identified two more of the plurality of games for the player; and allocating the player to the selected game.

16. The computer-readable storage medium of claim 15, wherein the request to join a game corresponds to at least one or more of: an end of an existing game in which the player was participating; disconnection of the player from an existing game in which the player is participating; and the current number of players of an existing game in which the player is participating falling below a defined threshold.

17. The computer-readable storage medium of claim 15, wherein the stored game history information includes a characteristic of the game.

18. The computer-readable storage medium of claim 17, wherein the characteristic includes one or more of: speed of play in the game, wagers placed in the game, a percentage of players to reach a defined stage in the game or in individual rounds of the game, or in a poker-style game, a percentage of players to see the flop.

19. The computer-readable storage medium of claim 15, further comprising:

analyzing data representative of one or more past play events of a given game to determine a characteristic of the game; and storing the characteristic in the stored game history information.

20. The computer-readable storage medium of claim 15, further comprising:

identifying a current game which meets a predetermined termination criterion;

for each player currently participating in the identified game, selecting another of plurality of games and allocate the player to the selected game; and terminating the identified game.

21. The computer-readable storage medium of claim 15, wherein the player communicates with the online game system via a client device over a telecommunication network, and the method further comprising:

monitoring a connection state for the client device to the online gaming system;

in response to detecting a disconnection of the client device from the online gaming system, pausing the game; and in response to the disconnected client device reconnecting to the online gaming system, joining the player to the paused game and resuming the game.

* * * * *